United States Patent
Lv

(10) Patent No.: US 12,487,094 B2
(45) Date of Patent: Dec. 2, 2025

(54) POINT OF INTEREST-BASED INFORMATION RECOMMENDATION METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventor: Meng Lv, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 308 days.

(21) Appl. No.: 17/902,707

(22) Filed: Sep. 2, 2022

(65) Prior Publication Data
US 2022/0412758 A1  Dec. 29, 2022

Related U.S. Application Data

(63) Continuation of application No. PCT/CN2021/118010, filed on Sep. 13, 2021.

(30) Foreign Application Priority Data

Oct. 22, 2020 (CN) .......................... 202011140744.5

(51) Int. Cl.
*G01C 21/34* (2006.01)
*G01C 21/36* (2006.01)

(52) U.S. Cl.
CPC ..... *G01C 21/3476* (2013.01); *G01C 21/3492* (2013.01); *G01C 21/3682* (2013.01)

(58) Field of Classification Search
CPC ............ G01C 21/3476; G01C 21/3492; G01C 21/3682; G06F 16/9537; G06F 16/9535
See application file for complete search history.

(56) References Cited

U.S. PATENT DOCUMENTS 10,823,578 B1 * 11/2020 England ............... G06F 16/9535
2015/0323341 A1 * 11/2015 Farrell ................. G01C 21/3611
701/426

(Continued)

FOREIGN PATENT DOCUMENTS

CN  106686063 A  5/2017
CN  108897022 A  11/2018

(Continued)

OTHER PUBLICATIONS

Ozdemir et al., Geofencing on the Real-Time GPS Tracking System and Improving GPS Accuracy with Moving Average, Kalman Filter, and Logistic Regression Analysis, 2019, 3rd International Symposium on Multidisciplinary Studies and Innovative Technologies (ISMSIT), Ankara, Turkey, 2019, pp. 1-6 (Year: 2019).*

(Continued)

*Primary Examiner* — John Van Bramer
(74) *Attorney, Agent, or Firm* — Sughrue Mion, PLLC

(57) ABSTRACT

A point of interest (POI)-based information recommendation method and apparatus, an electronic device, and a computer-readable storage medium are provided. The method includes: determining an encircling region encircling a POI in an electronic map; using an original boundary of the encircling region as an inner boundary and performing expansion processing on the inner boundary, to obtain an outer boundary of the encircling region; determining candidate location relationships between a terminal device and the inner boundary and the outer boundary according to positioning data of the terminal device; determining a real-time state according to a historical state of the terminal device and the candidate location relationships, the real-time state being used for representing a location relationship between the terminal device and the inner boundary; and controlling, (Continued)

according to the real-time state, information about the POI outputted through a location service.

15 Claims, 13 Drawing Sheets

(56) References Cited

U.S. PATENT DOCUMENTS

| | | | |
|---|---|---|---|
| 2016/0080911 A1* | 3/2016 | Kay | G01S 5/015 455/456.1 |
| 2018/0247339 A1* | 8/2018 | Demsey | G06F 16/9537 |
| 2019/0087840 A1 | 3/2019 | Zachariah et al. | |

FOREIGN PATENT DOCUMENTS

| | | | |
|---|---|---|---|
| CN | 110390045 A | 10/2019 | |
| CN | 110446166 A | 11/2019 | |
| CN | 112395495 A | 2/2021 | |
| WO | WO-2017126841 A1 * | 7/2017 | H04L 67/16 |

OTHER PUBLICATIONS

International Search Report for PCT/CN2021/118010 dated, Nov. 30, 2021 (PCT/ISA/210).
Written Opinion of the International Searching Authority for PCT/CN2021/118010 dated, Nov. 30, 2021 (PCT/ISA/210).

* cited by examiner

POINT OF INTEREST-BASED INFORMATION RECOMMENDATION METHOD AND APPARATUS, DEVICE, AND STORAGE MEDIUM

CROSS-REFERENCE TO RELATED APPLICATION(S)

This application is a continuation application of International Application No. PCT/CN2021/118010, filed on Sep. 13, 2021, which claims priority to Chinese Patent Application No. 202011140744.5, filed with the China National Intellectual Property Administration on Oct. 22, 2020, the disclosures of which are incorporated herein in their entireties.

FIELD

The present disclosure relates to Internet technologies and cloud technologies, and in particular, to a point of interest-based information recommendation method and apparatus, an electronic device, and a computer-readable storage medium.

BACKGROUND

With the popularization of mobile Internet, increasingly more services for a current user location are provided. A point of interest (POI)-based information recommendation service is a new application of a location based service (LBS), and when a user object such as a terminal device or a vehicle approaches a POI, service information related to the POI may be pushed to the user.

The related art lacks an effective solution that accurately and effectively pushes POI-related information, and mainly determines a relationship between the user and the POI according to a positioning signal to perform information recommendation. As a result, the accuracy of information recommendation is low, and computing resources of an electronic device consumed during information recommendation are also wasted.

SUMMARY

Some embodiments may provide a point of interest (POI)-based information recommendation method, performed by an electronic device, the method including: determining an encircling region encircling a POI in an electronic map; using an original boundary of the encircling region as an inner boundary and performing expansion processing on the inner boundary, to obtain an outer boundary of the encircling region; determining candidate location relationships between a terminal device and the inner boundary and the outer boundary according to positioning data of the terminal device; determining a real-time state according to a historical state of the terminal device and the candidate location relationships, the real-time state being used for representing a location relationship between the terminal device and the inner boundary; and controlling, according to the real-time state, information about the POI outputted through a location service.

Some embodiments may provide a point of interest (POI)-based information recommendation method, performed by an electronic device, the method including: obtaining positioning data of a terminal device in an electronic map, the positioning data being used for representing a location relationship between the terminal device and an encircling region; outputting information about a POI through a location service in response to that the terminal device is located inside an inner boundary of the encircling region, the POI being located inside the inner boundary; and continuing to output the information about the POI through the location service in response to that the terminal device is transferred from the inside of the inner boundary to a location between the inner boundary and an outer boundary of the encircling region.

Some embodiments may provide a point of interest (POI)-based information recommendation apparatus, including: an obtaining module, configured to determine an encircling region encircling a POI in an electronic map; an expanding module, configured to use an original boundary of the encircling region as an inner boundary and perform expansion processing on the inner boundary, to obtain an outer boundary of the encircling region; a location module, configured to determine candidate location relationships between a terminal device and the inner boundary and the outer boundary according to positioning data of the terminal device; a state module, configured to determine a real-time state according to a historical state of the terminal device and the candidate location relationships, the real-time state being used for representing a location relationship between the terminal device and the inner boundary; and a control module, configured to control, according to the real-time state, information about the POI outputted through a location service.

Some embodiments may provide a point of interest (POI)-based information recommendation apparatus, including: an obtaining module, configured to obtain positioning data of a terminal device in an electronic map, the positioning data being used for representing a location relationship between the terminal device and an encircling region; a response module, configured to output information about a POI through a location service in response to that the terminal device is located inside an inner boundary of the encircling region, the POI being located inside the inner boundary; and the response module being further configured to continue to output the information about the POI through the location service in response to that the terminal device is transferred from the inside of the inner boundary to a location between the inner boundary and an outer boundary of the encircling region.

Some embodiments may provide an electronic device, including: a memory, configured to store executable instructions; and a processor, configured to implement the POI-based information recommendation method provided in the foregoing embodiments when executing the executable instruction stored in the memory.

Some embodiments may provide a non-transitory computer-readable storage medium, storing executable instructions, the executable instructions, when executed by a processor, implementing the POI-based information recommendation method provided in the foregoing embodiments.

DESCRIPTION OF EMBODIMENTS

Figure 1:
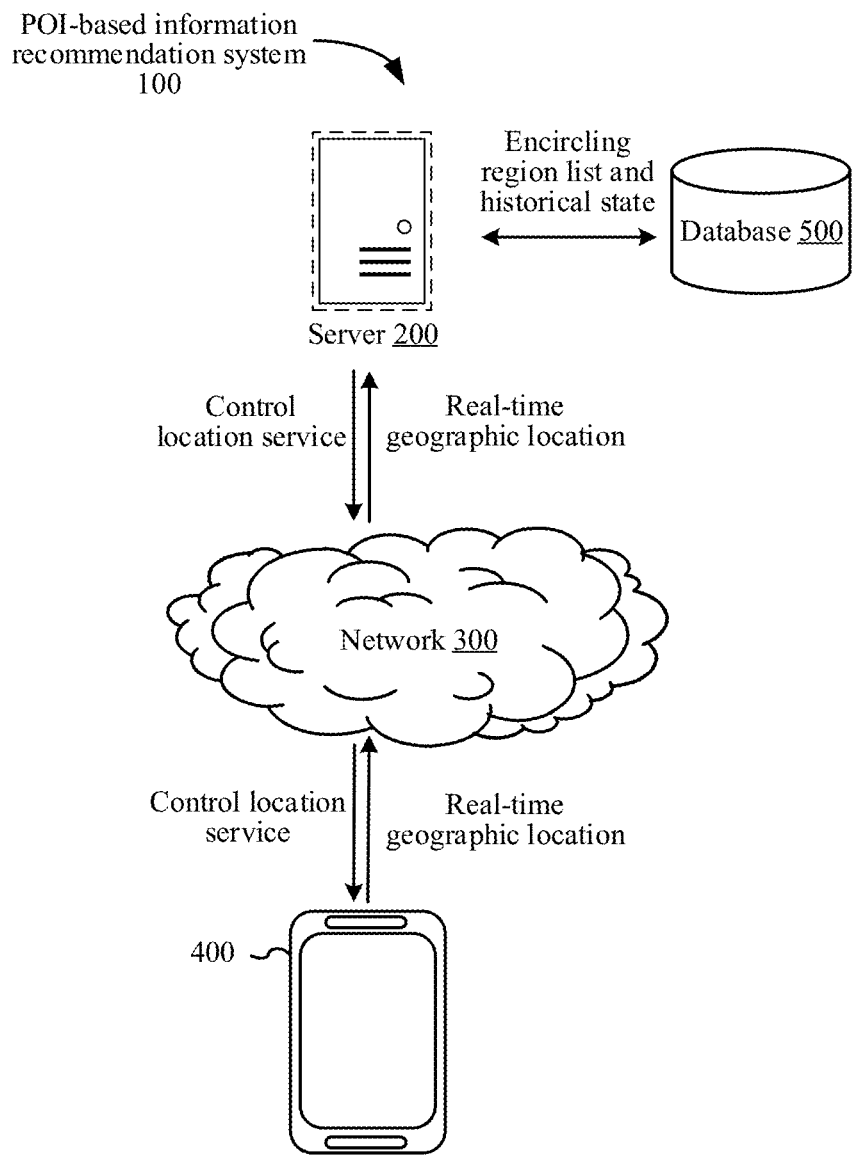
FIG. 1 is a schematic structural diagram of a point of interest (POI)-based information recommendation system according to some embodiments.

To make objectives, technical solutions, and advantages clearer, the following describes the embodiments in further detail with reference to the accompanying drawings. The described embodiments are not to be considered as limiting. All other embodiments obtained by a person of ordinary skill in the art without creative efforts shall fall within the protection scope of the disclosure.

In the following description, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in this specification are the same as that usually understood by a person skilled in the related technical field. Terms used in this specification are merely intended to describe objectives of some embodiments, but are not intended to be limiting.

Before the embodiments are further described in detail, a description is made on nouns and terms involved in some embodiments, and the nouns and terms involved in the embodiments are applicable to the following explanations.

1) A point of interest (POT) refers to an information point in a geographic information system.

2) A location based service (LBS) is referred to as a location service for short and uses positioning technologies of various types to obtain a current location of a positioning device (a positioned terminal device), to provide information resources and basic services to the positioning device through mobile Internet.

3) An encircling region is a virtual geographic boundary encircling a POI, for example, a virtual geographic region encircled by a geo-fencing, where the geo-fencing is a virtual fence. The encircling region is not limited to a specific shape, and may be a regular polygon or may be in an irregular shape, and a related event may be triggered when a terminal device enters or exits the virtual geographic boundary.

4) Expansion processing is to offset and expand points/edges of an original boundary of the encircling region outward by a specific distance to obtain an outer boundary. A region between the original boundary and the outer boundary is a buffer region, the encircling region and the buffer region together form a composite encircling region, and a boundary of the composite encircling region is the outer boundary obtained by expanding the encircling region. The original boundary is an inner boundary.

5) An encircling region state is a location relationship between the terminal device and the inner boundary of the encircling region, namely, is used for representing that the terminal device is located inside the inner boundary of the encircling region or located outside the inner boundary of the encircling region.

6) Positioning drift value: positioning drift refers to a relatively great difference between a positioning location and an actual location of the positioning device during positioning, and a distance between the positioning location and the actual location is the positioning drift value.

7) Time sensitivity is a difference between a time at which a user actually enters or exits the encircling region and a time at which the terminal device recognizes a corresponding state, which is used for measuring the real-time performance of functions of the encircling region.

8) Space sensitivity is a distance difference between a location where the user actually enters or exits the encircling region and a location where the terminal device can recognize a corresponding state, which is used for measuring a degree of sensitivity of functions of the encircling region in space.

In a process of implementing the embodiments, the inventor finds that the accuracy of POI-based information recommendation is an important indicator affecting the quality of information recommendation. In the related art, an encircling region is set around a POI, and location information of a geographic location of a user relative to the encircling region is determined according to a positioning signal, namely, whether the user enters or exits the encircling region of the POI, and an information service related to the POI is pushed to the user correspondingly. However, in a terminal device (for example, a mobile phone or a pad), a used Global Positioning System (GPS) module generally has a relatively great positioning error, and the positioning error generally may reach dozens of meters. In another example, the quality of GPS modules on an Internet of vehicles (IOV) device (an on board unit) is also uneven, and a positioning error thereof is greater than that of a high-end smart device. The location relationship between the user and the encircling region may be misjudged due to a geographic location acquisition error, leading to a wrong information recommendation trigger moment and low accuracy of information recommendation. In addition, irregular and frequent offsets of a geographic location during positioning may cause an enter/exit state of the user for the encircling region to change and jitter frequently. As a result, related functions are frequently triggered for the user, which seriously affects the accuracy of POI-based information recommendation, and computing resources of an electronic device consumed during information recommendation are also wasted.

The embodiments of the disclosure provide a POI-based information recommendation method and apparatus, an electronic device, and a computer-readable storage medium, which can greatly reduce a situation of misjudging an encircling region state and improve the judgment accuracy of the encircling region state and the accuracy of service pushing. The following describes an example embodiment of a POI-based information recommendation device. The device may be implemented as terminal devices of various types such as a notebook computer, a tablet computer, a desktop computer, a set-top box, or a terminal device (for example, a mobile phone, a portable music player, a personal digital assistant, a dedicated message device, or a portable game device), or may be implemented through collaboration of a terminal device and a server. An example embodiment is described below according to different scenarios:

Scenario 1: when the electronic device is implemented as a terminal device, the terminal device may autonomously obtain positioning data and determine a real-time state according to the positioning data, where the real-time state is used for representing a location relationship between the terminal device and an encircling region of a POI. The terminal device then controls an information recommendation function of a location service run in the terminal device according to the real-time state, for example, controls whether to enable the information recommendation function. The real-time state may be determined in combination with the positioning data and a historical state stored in the terminal device.

Scenario 2: when the electronic device is implemented through collaboration of a terminal device and a server, the terminal device sends the positioning data to the server, the server determines the real-time state according to the positioning data of the terminal device, and the server then controls the information recommendation function of the location service run in the terminal device according to real-time state.

The scenario 2 is used as an example. FIG. 1 is a schematic diagram architecture diagram of a POI-based information recommendation system 100 according to some embodiments. To implement and support a POI-based information recommendation application, a terminal device 400 is connected to a server 200 through a network 300, the network 300 may be a wide area network, a local area network, or a combination thereof, and the server 200 is connected to a database 500 to implement data access.

The server 200 obtains a real-time geographic location such as GPS positioning data reported by the terminal device 400, the server 200 then obtains an encircling region list of POIs around the real-time geographic location of the terminal device 400 and a historical state of the terminal device 400 from the database 500. The encircling region list includes encircling regions corresponding to several POIs, the POIs and the encircling regions are in a one-to-one correspondence, and the historical state is used for representing a historical location relationship between the terminal device 400 and an inner boundary of each of the encircling regions in the encircling region list. The server 200 determines a real-time state according to the encircling region list and the historical state of the terminal device 400, where the real-time state is used for representing a location relationship between the terminal device 400 and the inner boundary of each of the encircling regions of the surrounding POIs. When the real-time state represents that the terminal device 400 is located inside an inner boundary of an encircling region, the server 200 controls a location service in the terminal device 400 to output information about a POI corresponding to the encircling region; and when the real-time state represents that the terminal device 400 is located outside an inner boundary of an encircling region, the server 200 controls the location service in the terminal device 400 to stop outputting information about a POI corresponding to the encircling region. An output of information about a corresponding POI may be stopped by stopping the location service, and the location service is restarted and information of a POI is outputted when the real-time state is determined to meet an output condition later. Alternatively, an output of the location service may be paused, and information about a POI is outputted when the real-time state is determined to meet the output condition later, where the output condition is that the real-time state represents that the terminal device 400 is located inside an inner boundary of an encircling region. Information about a POI may be gourmet food pushing, friend recommendation, and scenery spot introduction, which may be correspondingly adjusted according to a type of the POI and a requirement in an actual application scenario.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal device 400 may be a smartphone, a tablet computer, a notebook computer, a desktop computer, a smart speaker, or a smart watch, but is not limited thereto. The terminal device and the server may be directly or indirectly connected in a wired or wireless communication manner. This is not limited thereto.

Figure 2:
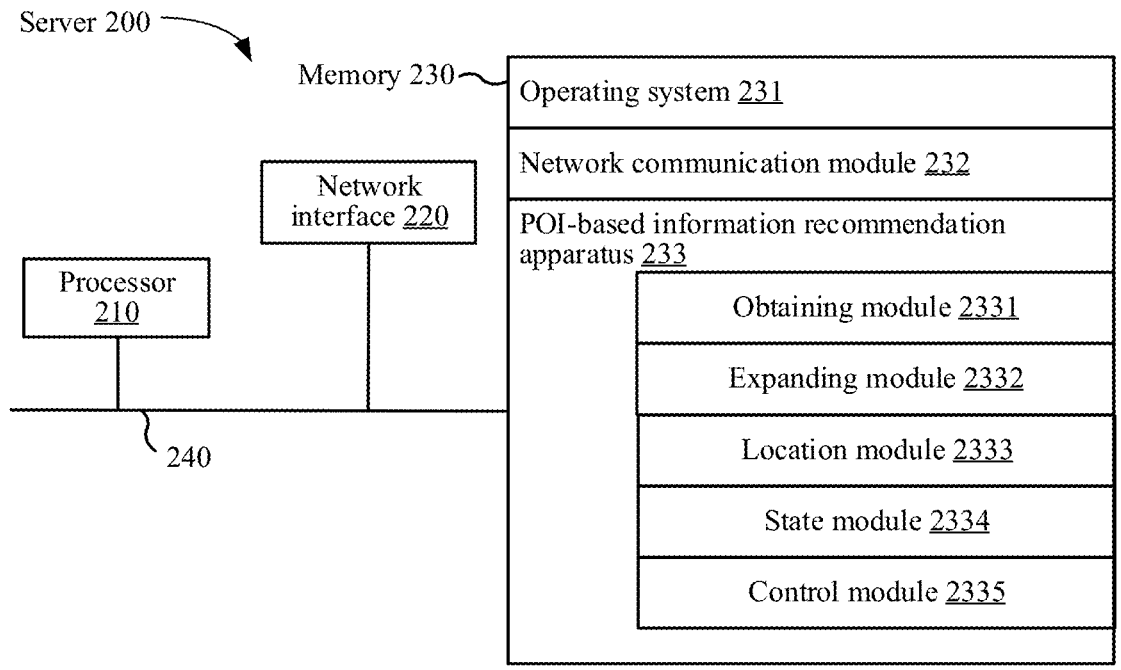
FIG. 2 is a schematic structural diagram of a server according to some embodiments.

FIG. 2 is a schematic structural diagram of a server 200 according to some embodiments. The structure as shown in FIG. 2 is described as an example in which the electronic device provided in some embodiments is the server 200 shown in FIG. 1. The server 200 shown in FIG. 2 includes at least one processor 210, a memory 230, and at least one network interface 220. Components in the server 200 are coupled together through a bus system 240. It may be understood that, the bus system 240 is configured to implement connection and communication between the components. In addition to a data bus, the bus system 240 further includes a power bus, a control bus, and a state signal bus. However, for ease of clear description, all types of buses in FIG. 2 are marked as the bus system 240.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, or any conventional processor.

The memory 230 may be a removable memory, a non-removable memory, or a combination thereof. Exemplary hardware devices include a solid-state memory, a hard disk drive, or an optical disc drive. The memory 230 may optionally include one or more storage devices that are physically away from the processor 210.

The memory 230 includes a volatile memory or a non-volatile memory, or may include a volatile memory and a non-volatile memory. The non-volatile memory may be a read-only memory (ROM), and the volatile memory may be a random access memory (RAM). The memory 230 described in some embodiments is to include any other suitable type of memories.

In some embodiments, the memory 230 can store data to support various operations, and examples of the data include programs, modules, and data structures, or subsets or supersets thereof, as illustrated below.

An operating system 231 includes a system program configured to process various basic system services and perform a hardware-related task, for example, a framework layer, a core library layer, and a driver layer, and is configured to implement various basic services and process a hardware-based task.

A network communication module 232 is configured to reach another computing device through one or more (wired or wireless) network interfaces 220. Exemplary network interfaces 220 include: Bluetooth, wireless compatible authentication (Wi-Fi), and a universal serial bus (USB).

In some embodiments, a POI-based information recommendation apparatus provided in some embodiments may be implemented in a software manner. FIG. 2 shows a POI-based information recommendation apparatus 233 stored in the memory 230. The apparatus may be software in the form of a program or a plug-in, including the following software modules: an obtaining module 2331, an expanding module 2332, a location module 2333, a state module 2334, and a control module 2335. These modules are logical, and therefore, can be combined or further divided in any way depending on functions to be implemented. A function of each module is described below.

In some embodiments, when the electronic device provided in some embodiments is implemented as a terminal device, in addition to the structure shown in FIG. 2, the terminal device may further include structures such as a user interface, a display module, and an input processing module. The user interface includes one or more output apparatuses that enable presentation of media content, including one or more speakers and/or one or more visual display screens. The user interface further includes one or more input apparatuses, including user interface components that facilitate inputting of a user, such as a keyboard, a mouse, a microphone, a touch display screen, a camera, and other input buttons and controls. The display module is configured to display information through an output apparatus (for example, a display screen or a speaker) associated with one or more user interfaces (for example, a user interface configured to operate a peripheral device and display content and information). The input processing module is configured to detect one or more user inputs or interactions from one of the one or more input apparatuses and translate the detected input or interaction.

With reference to an example embodiment of the electronic device, the POI-based information recommendation method is described. As described above, the operations shown in FIG. 3 may be independently implemented by the terminal device, or may be collaboratively implemented by the terminal device and the server.

Figure 3:
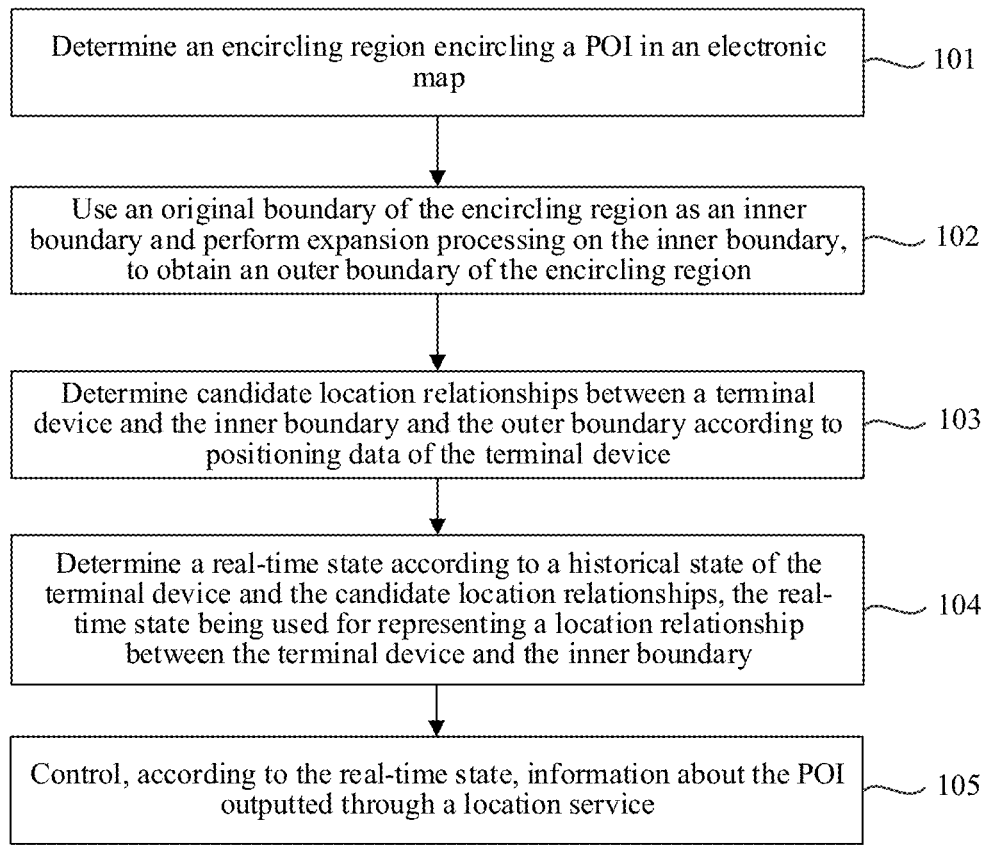
FIG. 3 is a schematic flowchart of a POI-based information recommendation method according to some embodiments.

FIG. 3 is a schematic flowchart of a POI-based information recommendation method according to some embodiments, which is described with reference to the operations shown in FIG. 3.

Operation 101: Determine an encircling region encircling a POI in an electronic map.

For example, a POI may be an information point in an electronic map, and the electronic map may include a plurality of POIs. For example, the POI may be a shopping mall, a park, or a gas station in the electronic map, or may be a house or a moving user. An encircling region may be correspondingly set for each POI. The encircling region uses the POI as a core and is not limited to a specific shape, which may be a regular polygon or may be in an irregular shape, or may be in a shape set according to a specific geographic environment around the POI. For example, an encircling region is set according to streets around the POI. When a terminal device enters the encircling region of the POI, an Internet service corresponding to the POI may be implemented.

Operation 102: Use an original boundary of the encircling region as an inner boundary and perform expansion processing on the inner boundary, to obtain an outer boundary of the encircling region.

An original boundary (or referred to as an inner boundary) of the encircling region of the POI is a boundary whose width is zero. When the terminal device approaches the inner boundary of the encircling region, a location relationship between the terminal device and the inner boundary of the encircling region may be misjudged due to an offset of a GPS positioning signal, and as a result, an adverse effect may be caused on the accuracy of information recommendation performed based on an encircling region enter/exit state of the terminal device. In some embodiments, to eliminate the adverse effect of a positioning signal drift on information recommendation, the original boundary of the encircling region is used as the inner boundary and expansion processing is performed on the inner boundary, to obtain an outer boundary of the encircling region. A region between the inner boundary and the outer boundary is a buffer region, the encircling region and the buffer region together form a composite encircling region, and a boundary of the composite encircling region is the outer boundary obtained by expanding the original encircling region.

Figure 4:
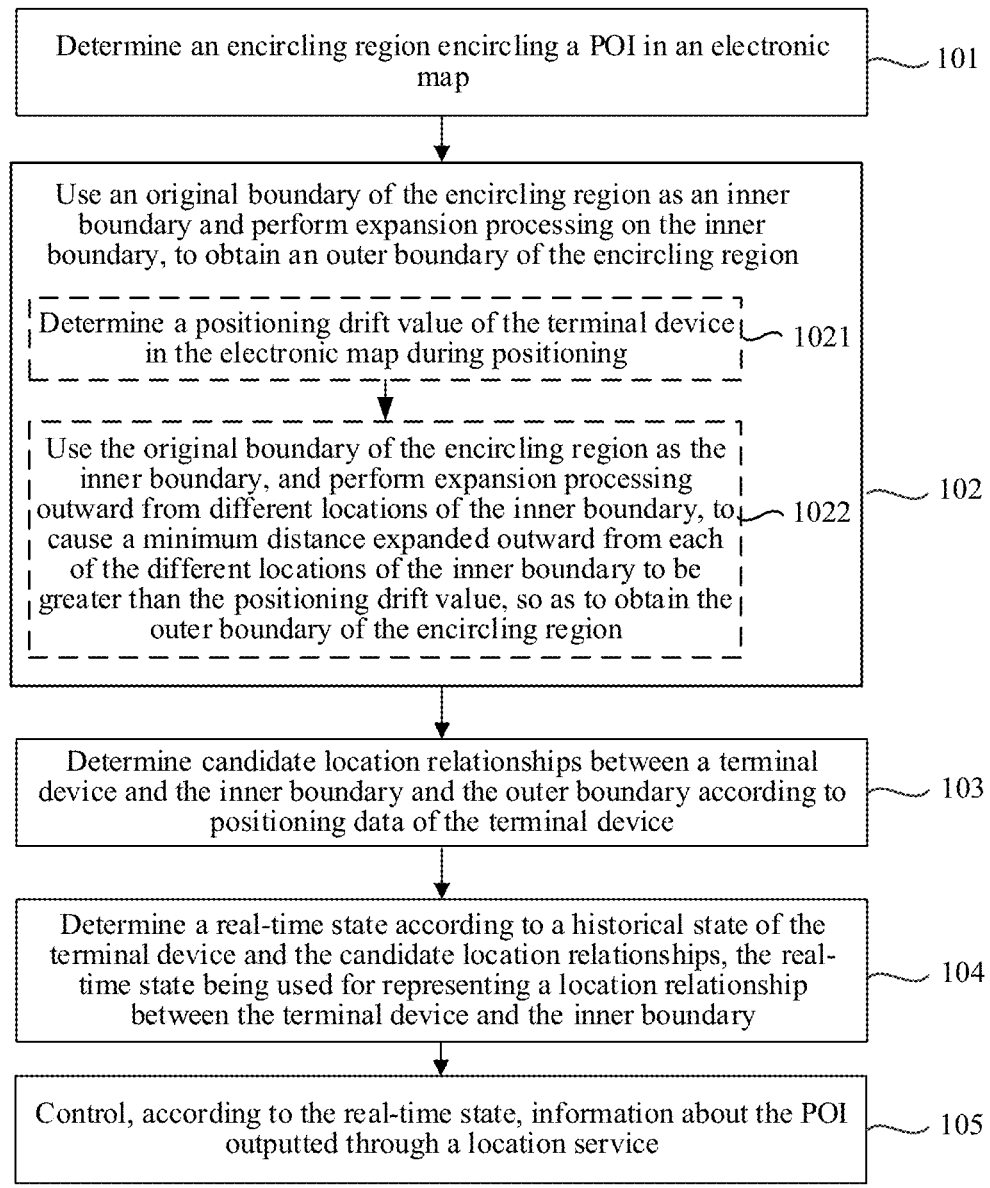
FIG. 4 is a schematic flowchart of a POI-based information recommendation method according to some embodiments.

FIG. 4 is a schematic flowchart of a POI-based information recommendation method according to some embodiments, operation 102 in FIG. 3 may be implemented through operations 1021 and 1022 in FIG. 4, and an example is provided below for description.

Operation 1021: Determine a positioning drift value of the terminal device in the electronic map during positioning.

A positioning drift value is an important factor affecting the accuracy of information recommendation performed based on the encircling region enter/exit state of the terminal device, so that the positioning drift value of the terminal device in the electronic map during positioning may be determined.

In some embodiments, to determine the positioning drift value of the terminal device in the electronic map during positioning, an attribute value of the terminal device may be obtained, where the attribute value of the terminal device includes at least one of the following: a type of the terminal device or a hardware parameter of the terminal device; and a positioning drift value corresponding to the attribute value of the terminal device is determined. The hardware parameter of the terminal device may be a performance parameter of a GPS chip, such as sensitivity or anti-interference performance.

For example, an attribute value of a sample terminal device and a plurality of pieces of associated data of a positioning drift value of the sample terminal device in the electronic map during positioning (serving as the positioning drift value of the sample) are obtained. The associated data may be autonomously reported by the user or may be counted by a system service during running. The sample terminal device and the terminal device in operation 1021 may be the same or may be different. When the attribute values of the terminal device are different, the positioning drift values of the terminal device in the electronic map during positioning are different, so that preprocessing such as data cleaning, data completion, and noise filtering is performed on the associated data, to count positioning drift value ranges respectively corresponding to different attribute values, a maximum value or a mean value in each positioning drift value ranges is selected as a positioning drift value corresponding to the respective attribute value, and a mapping relationship between the attribute value and the corresponding positioning drift value is then established and stored in a mapping table. When the positioning drift value of the terminal device in the electronic map during positioning needs to be determined, the positioning drift value of the terminal device in the electronic map during positioning may be quickly obtained in a table look-up manner (namely, querying is performed in the mapping table according to the attribute value of the terminal device).

An example in which the attribute value is a type is used. It is assumed that common types of the terminal device includes a type A, a type B, and a type C, positioning drift values (or associated data) of sample terminal devices of the three types in the electronic map during positioning may be counted respectively, to obtain a result that positioning drift values of a terminal device of the type A during positioning fall between 5 meters to 15 meters (namely, a positioning drift value range, and similarly hereinafter), positioning drift values of a terminal device of the type B during positioning fall between 10 meters to 30 meters, and positioning drift values of a terminal device of the type C during positioning fall between 20 meters to 40 meters. According to a manner of taking the maximum value, the positioning drift value of the terminal device of the type A is 15 meters, the positioning drift value of the terminal device of the type B is 30 meters, the positioning drift value of the terminal device of the type C is 40 meters, and a mapping relationship between the three types of terminal devices and the respective positioning drift values is established and stored in the mapping table. When the terminal device in operation 1021 is a terminal device of the type A, the positioning drift value of 15 meters of the terminal device in the electronic map during positioning may be quickly obtained in a table look-up manner.

For example, the attribute value of the sample terminal device and the associated data of the positioning drift value of the sample terminal device in the electronic map during positioning are obtained, preprocessing such as data cleaning, data completion, and noise filtering is performed on the associated data, and a training sample set is obtained based on the attribute value and the preprocessed associated data. The training sample set includes a plurality of training samples, each training sample includes an attribute value serving as a model input and one piece of preprocessed associated data serving as a mark output (namely, a label). A machine learning model is then trained based on the training sample set, and the machine learning model may be a logistic regression model, a support vector machine model, a neural network model, or an ensemble learning model. Finally, when the positioning drift value of the terminal device in the electronic map during positioning needs to be determined, the attribute value of the terminal device may be directly inputted into a trained machine learning model, and an output value of the model is the positioning drift value corresponding to the attribute value of the terminal device.

In some embodiments, to determine the positioning drift value of the terminal device in the electronic map during positioning, a state of a positioning signal used for performing positioning in the electronic map may be obtained; an environment feature of the POI is obtained; and the positioning drift value of the terminal device in the electronic map is determined according to the state of the positioning signal and the environment feature.

For example, the state of the positioning signal includes a speed rate, an intensity, or a delay value of the positioning signal, and the environment feature of the POI includes a type of a geographic environment in which the POI is located, such as weather (sunny or rainy), a geographic range (a city or a street in which the POI is located), or an environment type (for example, an urban area, a suburban area, or a park). Different states of the positioning signal and different environment features may lead to different positioning drift values in the electronic map during positioning, and for example, the positioning drift value may be relatively large in rain and snow weather or when the POI is located in buildings. To quantify an effect of the state of the positioning signal and the environment feature of the POI on the positioning drift value, a state of a positioning signal for performing positioning in the electronic map and an environment feature of a sample terminal device and associated data of a positioning drift value of the sample terminal device in the electronic map during positioning may be obtained, positioning drift values respectively corresponding to different state-environment feature combinations (namely, each state-environment feature combination includes a state of one positioning signal and one environment feature) are counted by performing data cleaning, data completion, and noise filtering on the associated data, a maximum value or a mean value in each positioning drift value range is selected as a positioning drift value corresponding to the respective state-environment feature combination, and a mapping relationship between the state-environment feature combination and the positioning drift value is established and stored in the mapping table. When the positioning drift value of the terminal device in the electronic map during positioning needs to be determined, the positioning drift value of the terminal device in the electronic map during positioning may be quickly obtained in a table look-up manner (namely, querying is performed in the mapping table according to the state of the positioning signal and the environment feature).

For example, the state of the positioning signal for performing positioning in the electronic map and the environment feature of the sample terminal device and the associated data of the positioning drift value of the sample terminal device in the electronic map during positioning are obtained, and a training sample set is constructed based on the preprocessed associated data. The training sample set includes a plurality of training samples, each training sample includes a state-environment feature combination serving as a model input and one piece of preprocessed associated data serving as a mark output (namely, a label). A machine learning model is then trained based on the training sample set, and the machine learning model may be a logistic regression model, a support vector machine model, a neural network model, or an ensemble learning model. Finally, when the positioning drift value of the terminal device in the electronic map during positioning needs to be determined, the state of the positioning signal and the environment feature that are obtained in real time may be directly inputted into a trained machine learning model, and an output value of the model is the positioning drift value corresponding to the state of the positioning signal and the environment feature that are obtained in real time.

The positioning drift value is determined according to the attribute value or the state-environment feature combination in real time of the terminal device, so that the positioning drift value is obtained according to a real-time scenario, thereby improving the accuracy of the positioning drift value and improving the accuracy of subsequent expansion processing and encircling region state determination.

Operation 1022: Use the original boundary of the encircling region as the inner boundary, and perform expansion processing outward from different locations of the inner boundary, to cause a minimum distance expanded outward from each of the different locations of the inner boundary to be greater than the positioning drift value, so as to obtain the outer boundary of the encircling region.

For example, when expansion processing is performed outward from different locations of the inner boundary, a plurality of boundary segments of the inner boundary of the encircling region are determined; expansion processing is respectively performed on the plurality of boundary segments, to cause a distance between each of the expanded boundary segments and an original location to be greater than the positioning drift value; and conformal connection processing is performed on the plurality of expanded boundary segments, to obtain the outer boundary of the encircling region. The boundary segment may be, for example, a smooth boundary segment.

By causing the expanded minimum distance to be greater than the positioning drift value, the encircling region state is determined in combination with an obtained buffer region, so that the accuracy of encircling region state determination may be improved. Meanwhile, by performing conformal connection processing during expansion processing, it is ensured that a shape of a composite encircling region obtained after expansion processing and a shape of the original encircling region are close, thereby improving an actual effect of POI-based information recommendation.

Operation 103: Determine candidate location relationships between a terminal device and the inner boundary and the outer boundary according to positioning data of the terminal device.

For example, terminal device positioning may be performed based on GPS, namely, terminal device positioning is implemented by transmitting a location signal of the terminal device to a positioning backend through a GPS positioning module on the terminal device; or positioning may be performed based on a base station of a mobile operator network, namely, a location of the terminal device is determined by using the base station according to a measurement distance to the terminal device, so that positioning data of the terminal device is obtained. Candidate location relationships between the terminal device and the inner boundary and the outer boundary are then determined according to the positioning data.

Operation 104: Determine a real-time state according to a historical state of the terminal device and the candidate location relationships, the real-time state being used for representing a location relationship between the terminal device and the inner boundary.

A time at which a historical state is determined is earlier than a time at which a real-time state is determined, and the historical state is used for representing a historical location relationship between the terminal device and the inner boundary of the encircling region of the POI.

In some embodiments, the real-time state is determined as that the terminal device is located outside the inner boundary in a case that the historical state of the terminal device represents that the terminal device is located outside the inner boundary and the candidate location relationships represent that the terminal device is located outside the inner boundary; the real-time state is determined as that the terminal device is located inside the inner boundary in a case that the historical state of the terminal device represents that the terminal device is located outside the inner boundary and the candidate location relationships represent that the terminal device is located inside the inner boundary; the real-time state is determined as that the terminal device is located outside the inner boundary in a case that the historical state of the terminal device represents that the terminal device is located inside the inner boundary and the candidate location relationships represent that the terminal device is located outside the outer boundary; and the real-time state is determined as that the terminal device is located inside the inner boundary of the encircling region in a case that the historical state of the terminal device represents that the terminal device is located inside the inner boundary and the candidate location relationships represent that the terminal device is located inside the outer boundary.

In this way, the outer boundary is obtained by expanding the encircling region, and a buffer region is added outside the encircling region. Encircling region state determination is performed based on the encircling region and the buffer region, in a case of determining that the terminal device exits from the encircling region, the terminal device needs to be located outside the outer boundary, thereby eliminating a problem that the encircling region enter/exit states change frequently due to a positioning signal drift. Therefore, the accuracy of POI-based information recommendation is improved, the interaction efficiency between the terminal device and the location service is also improved, and resource saving is implemented.

Operation 105: Control, according to the real-time state, information about the POI outputted through a location service.

In some embodiments, information about the POI is outputted through a location service in a case that the real-time state is that the terminal device is located inside the inner boundary; and outputting of the information about the POI is stopped through the location service in a case that the real-time state is that the terminal device is located outside the inner boundary.

The information about the POI is outputted through the location service according to the real-time state, so that the accuracy and effectiveness of information recommendation are improved, information recommendation at a wrong moment is reduced, the interaction efficiency is improved, and resource saving is implemented.

Figure 5:
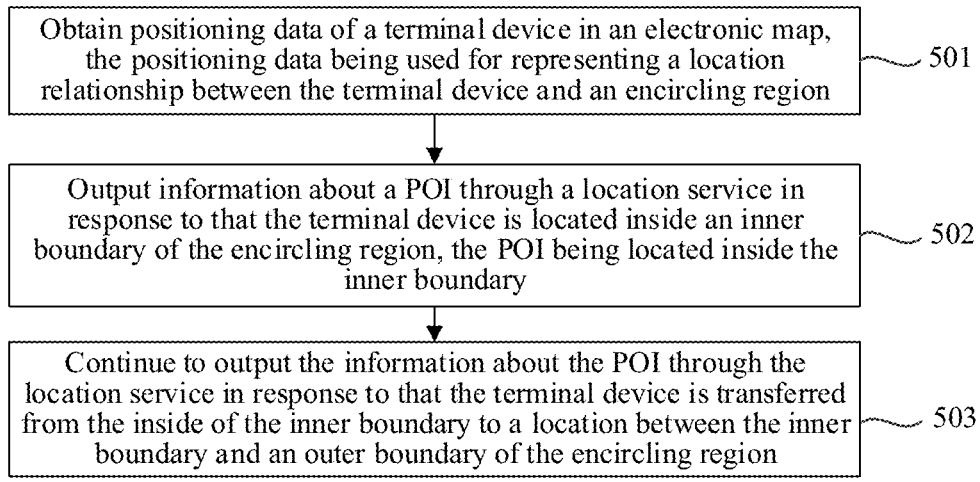
FIG. 5 is a schematic flowchart of a POI-based information recommendation method according to some embodiments.

FIG. 5 is a schematic flowchart of a POI-based information recommendation method according to some embodiments, which is described with reference to the operations shown in FIG. 5. As described above, the operations shown in FIG. 5 may be implemented by a terminal device or may be collaboratively implemented by a terminal device and a server.

Operation 501: Obtain positioning data of a terminal device in an electronic map, the positioning data being used for representing a location relationship between the terminal device and an encircling region.

Operation 502: Output information about a POI through a location service in response to that the terminal device is located inside an inner boundary of the encircling region, the POI being located inside the inner boundary.

Figure 6:
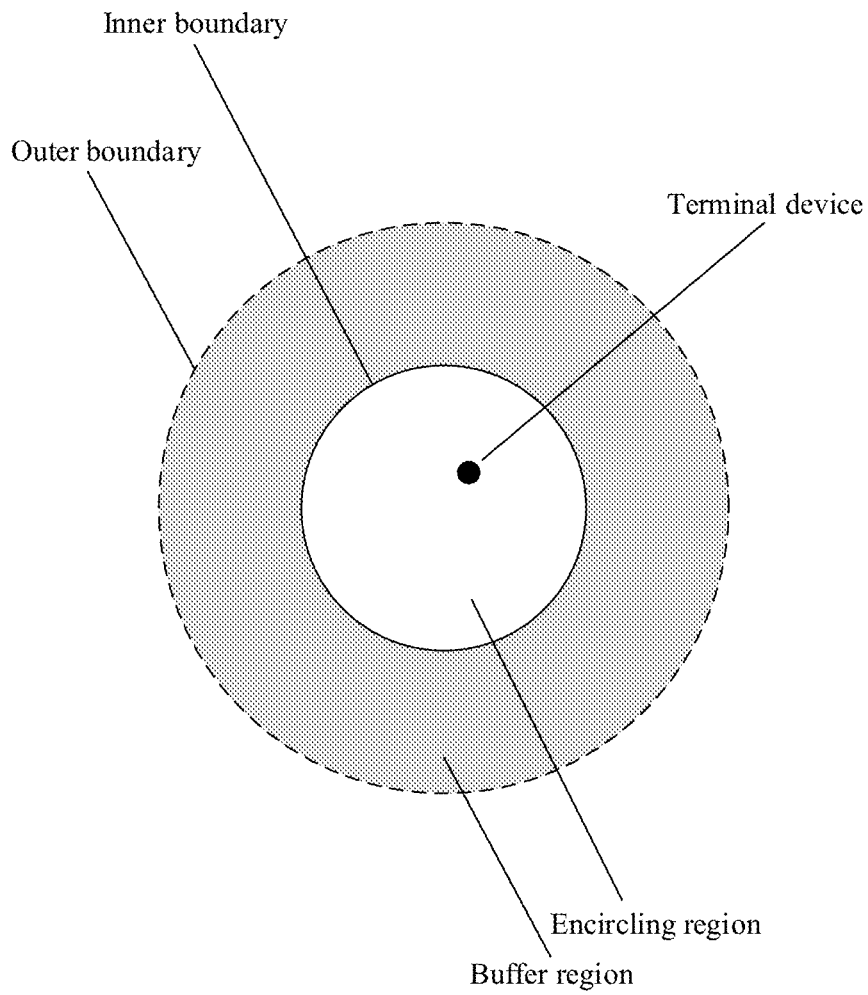
FIG. 6 is a schematic diagram of a location relationship between a terminal device and an encircling region according to some embodiments.

FIG. 6 is a schematic diagram of locations of a terminal device and an encircling region. As shown in FIG. 6, the terminal device is located inside the inner boundary of the encircling region, and the information about the POI is outputted through the location service.

Operation 503: Continue to output the information about the POI through the location service in response to that the terminal device is transferred from the inside of the inner boundary to a location between the inner boundary and an outer boundary of the encircling region.

Figure 7A:
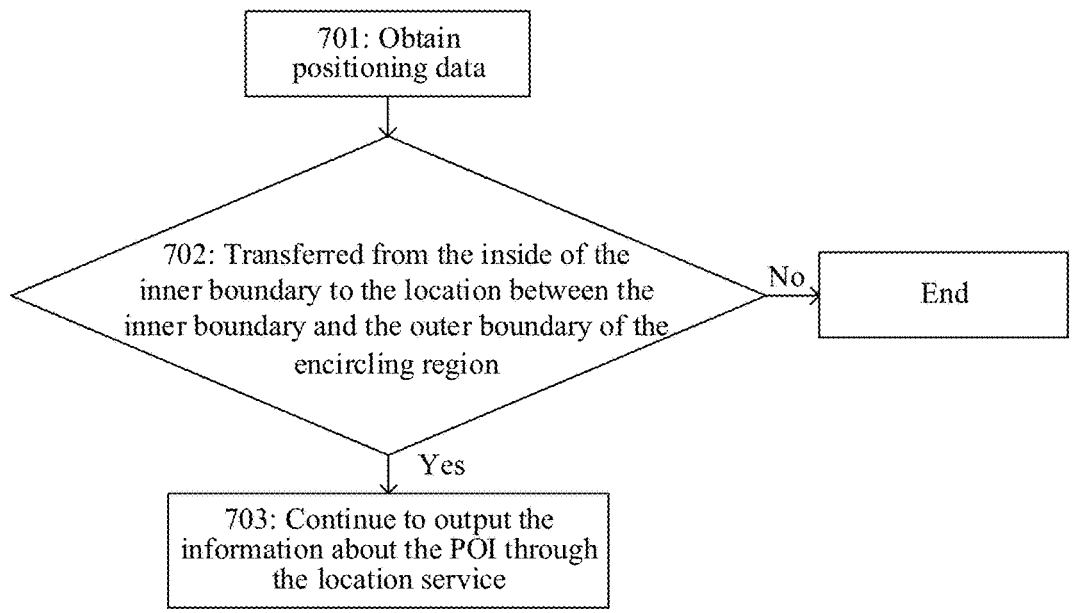
FIG. 7A is a schematic flowchart of determining a location relationship between a terminal device and an encircling region according to some embodiments.
Figure 7B:
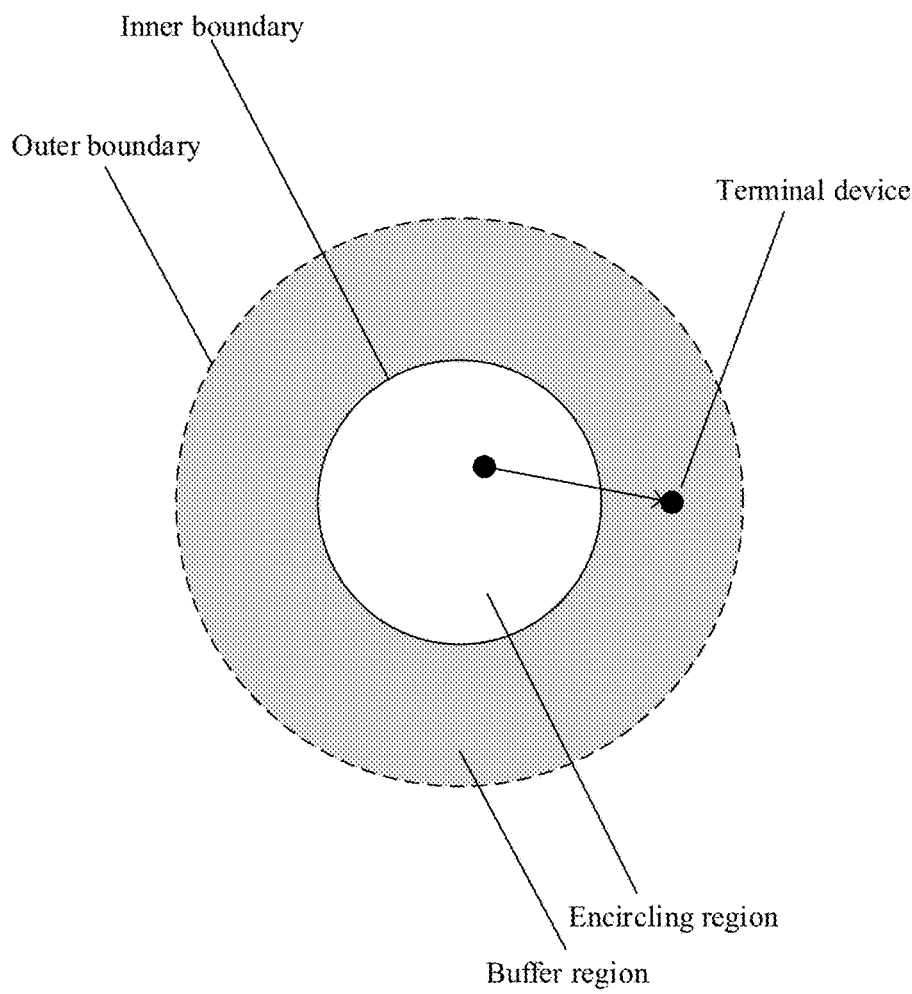
FIG. 7B is a schematic diagram of a location relationship between a terminal device and an encircling region according to some embodiments.

FIG. 7A is a schematic flowchart of determining a location relationship between a terminal device and an encircling region. As shown in FIG. 7A, in operation 701, positioning data is obtained; in operation 702, whether the terminal device is transferred from the inside of the inner boundary to the location between the inner boundary and the outer boundary of the encircling region is determined; and operation 703 of continuing to output the information about the POI through the location service is performed in a case that the terminal device is transferred from the inside of the inner boundary to the location between the inner boundary and the outer boundary of the encircling region. FIG. 7B is a schematic diagram of a location relationship between a terminal device and an encircling region. As shown in FIG. 7B, in a case that the terminal device is transferred from the inside of the inner boundary to the location (namely, the buffer region) between the inner boundary and the outer boundary of the encircling region, the information about the POI continues to be outputted through the location service.

In some embodiments, outputting of the information about the POI is stopped through the location service in response to that the terminal device is transferred from the inside of the inner boundary to the outside of the outer boundary.

Figure 8A:
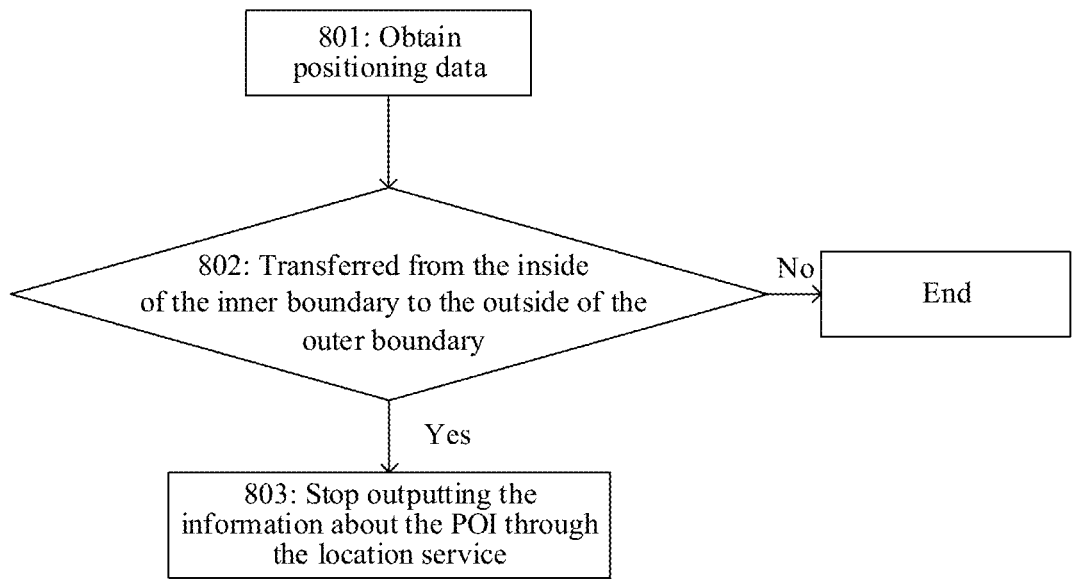
FIG. 8A is a schematic flowchart of determining a location relationship between a terminal device and an encircling region according to some embodiments.
Figure 8B:
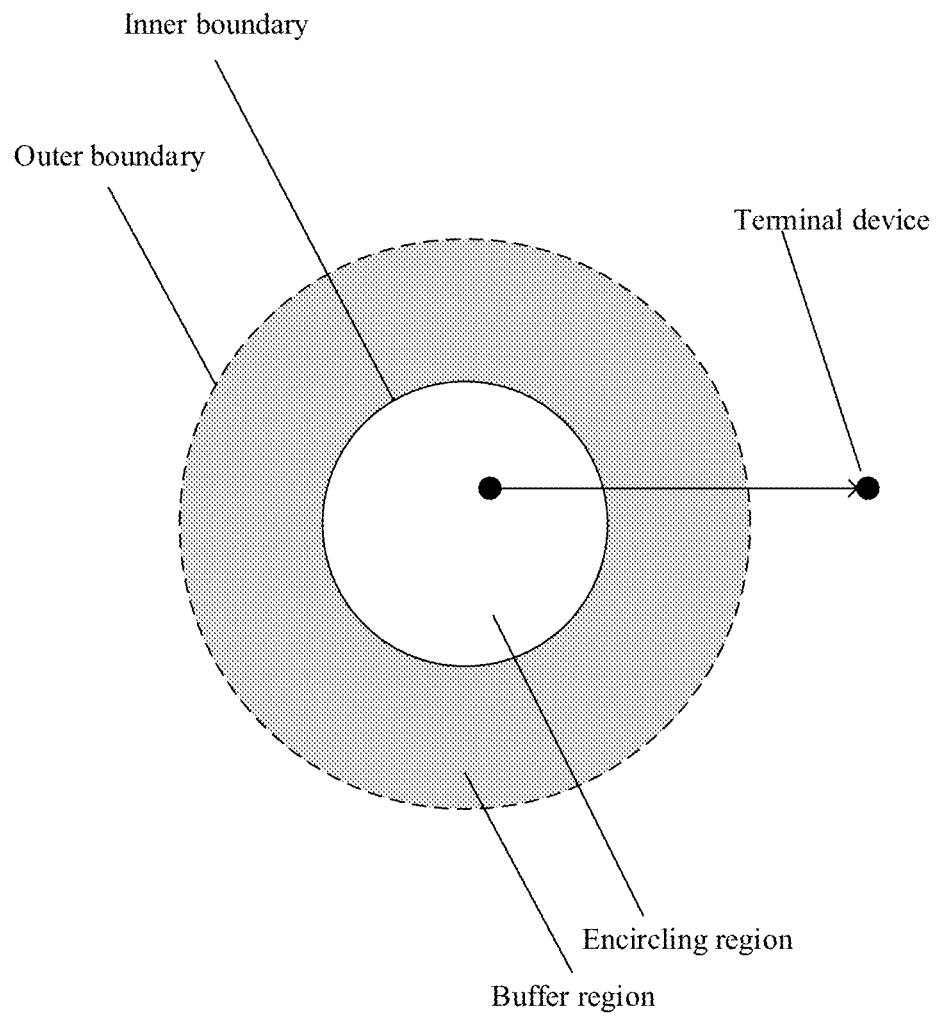
FIG. 8B is a schematic diagram of a location relationship between a terminal device and an encircling region according to some embodiments.

FIG. 8A is a schematic flowchart of determining a location relationship between a terminal device and an encircling region. As shown in FIG. 8A, in operation 801, positioning data is obtained; in operation 802, whether the terminal device is transferred from the inside of the inner boundary to the outside of the outer boundary is determined; and operation 803 of stopping outputting the information about the POI through the location service is performed in a case that the terminal device is transferred from the inside of the inner boundary to the outside of the outer boundary. FIG. 8B is a schematic diagram of a location relationship between a terminal device and an encircling region. As shown in FIG. 8B, in a case that the terminal device is transferred from the inside of the inner boundary to the outside of the outer boundary, outputting of the information about the POI is stopped through the location service.

In some embodiments, the information about the POI is outputted through the location service in response to that the terminal device is transferred from the outside of the outer boundary to the inside of the inner boundary.

Figure 9A:
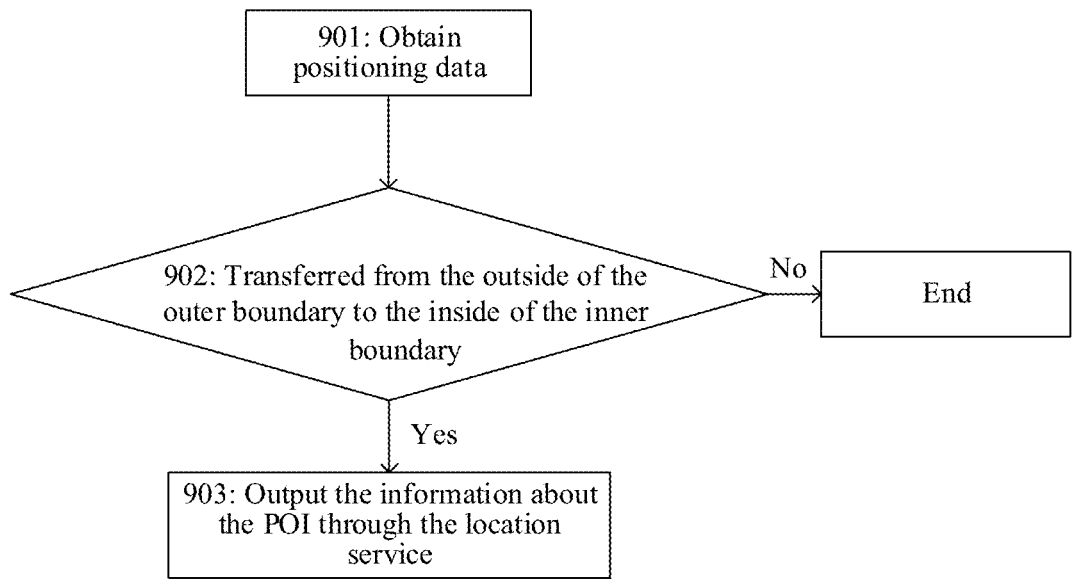
FIG. 9A is a schematic flowchart of determining a location relationship between a terminal device and an encircling region according to some embodiments.
Figure 9B:
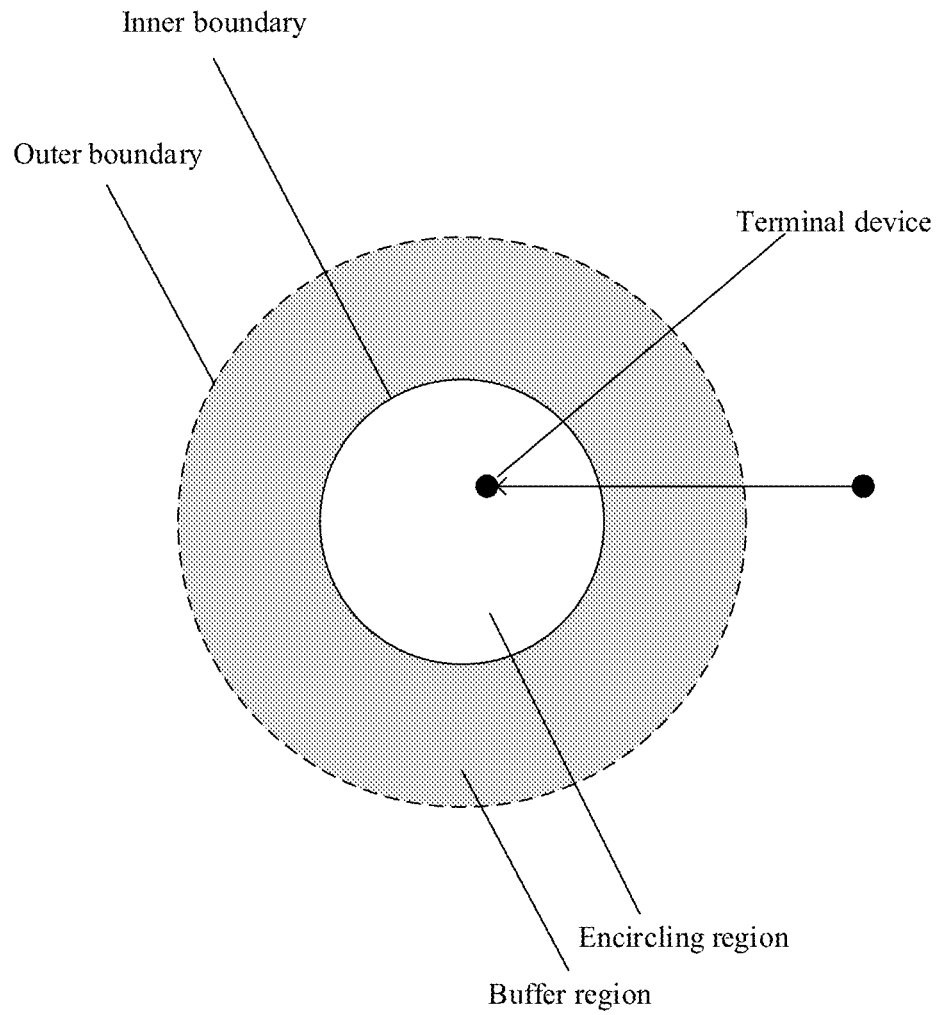
FIG. 9B is a schematic diagram of a location relationship between a terminal device and an encircling region according to some embodiments.

FIG. 9A is a schematic flowchart of determining a location relationship between a terminal device and an encircling region. As shown in FIG. 9A, in operation 901, positioning data is obtained; in operation 902, whether the terminal device is transferred from the outside of the outer boundary to the inside of the inner boundary is determined; and operation 903 of outputting the information about the POI through the location service is performed in a case that the terminal device is transferred from the outside of the outer boundary to the inside of the inner boundary. FIG. 9B is a schematic diagram of a location relationship between a terminal device and an encircling region. As shown in FIG. 9B, in a case that the terminal device is transferred from the outside of the outer boundary to the inside of the inner boundary, the information about the POI is outputted through the location service.

In some embodiments, outputting of the information about the POI is stopped through the location service in response to that the terminal device is continuously located outside the outer boundary or is transferred from the outside of the outer boundary to the location between the inner boundary and the outer boundary. That the terminal device is continuously located outside the outer boundary may be that positioning data consecutively obtained for at least twice all represents that the terminal device is located outside the outer boundary, and certainly, the number of times herein may be set according to an actual application scenario and is not limited herein.

Figure 10A:
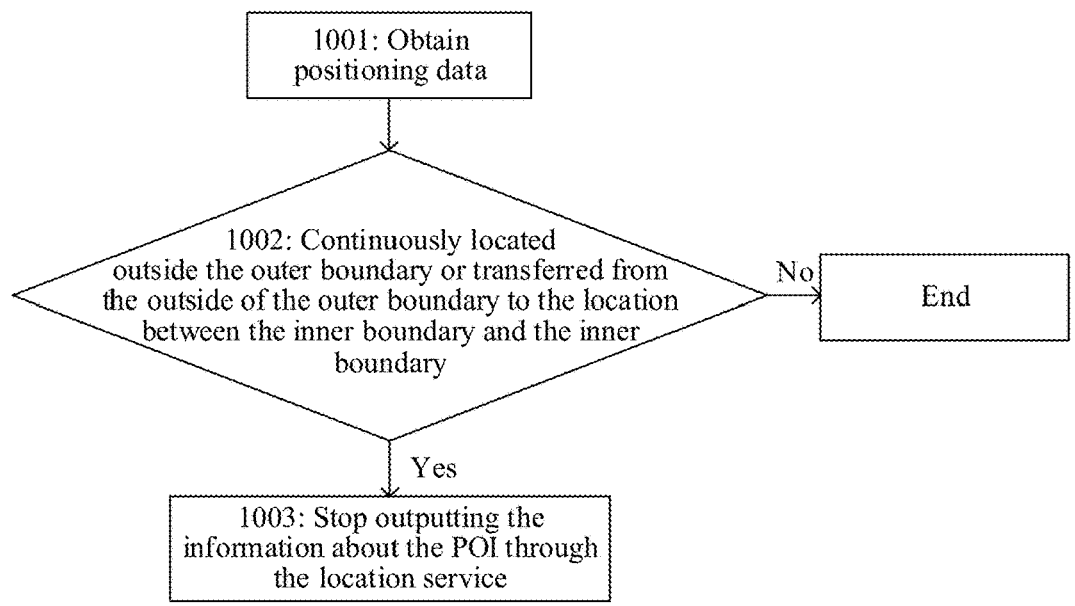
FIG. 10A is a schematic flowchart of determining a location relationship between a terminal device and an encircling region according to some embodiments.
Figure 10B:
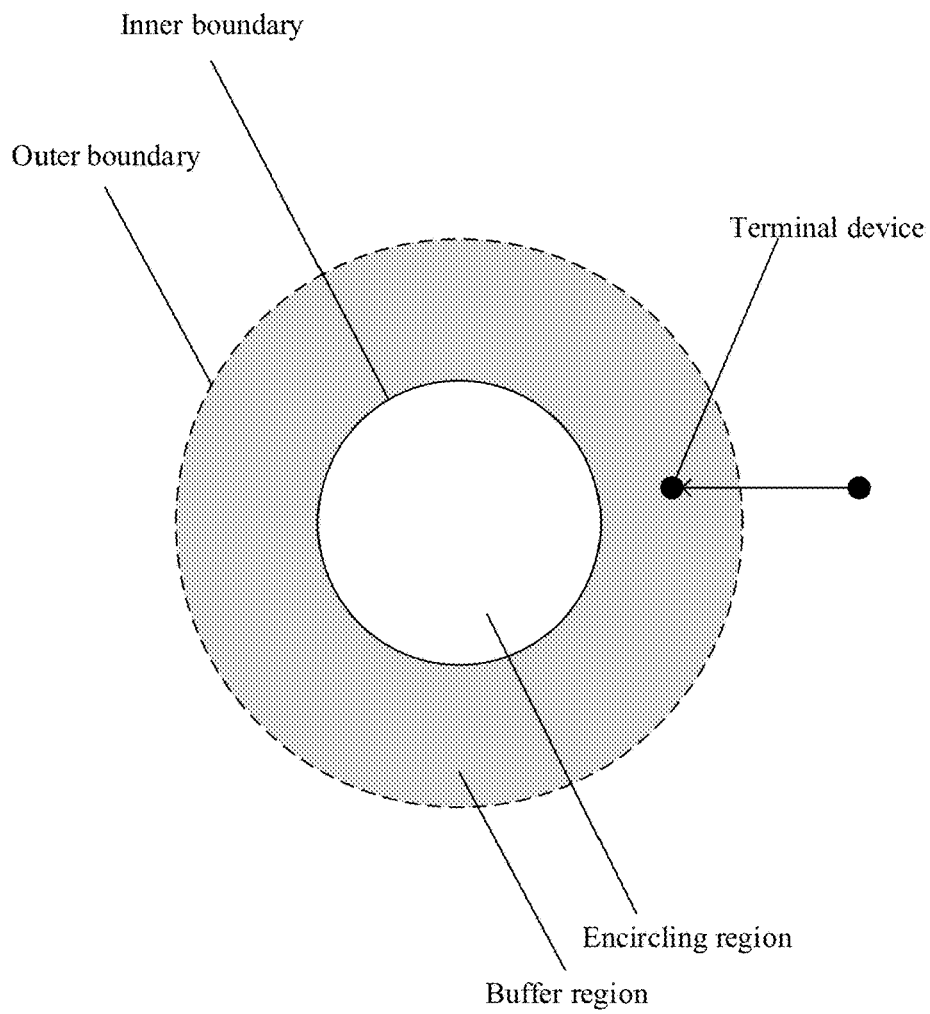
FIG. 10B is a schematic diagram of a location relationship between a terminal device and an encircling region according to some embodiments.

FIG. 10A is a schematic flowchart of determining a location relationship between a terminal device and an encircling region. As shown in FIG. 10A, in operation 1001, positioning data is obtained; in operation 1002, whether the terminal device is continuously located outside the outer boundary or is transferred from the outside of the outer boundary to the location between the inner boundary and the inner boundary is determined; and operation 1003 of stopping outputting the information about the POI through the location service is performed in a case that the terminal device is continuously located outside the outer boundary or is transferred from the outside of the outer boundary to the location between the inner boundary and the outer boundary. FIG. 10B is a schematic diagram of positions of a terminal device and an encircling region. As shown in FIG. 10B, in a case that the terminal device is transferred from the outside of the outer boundary to the location between the inner boundary and the outer boundary, outputting of the information about the POI is stopped through the location service.

In some embodiments, before the positioning data of the terminal device in the electronic map is obtained, the original boundary of the encircling region may be used as an inner boundary and expansion processing is performed on the inner boundary, to obtain an outer boundary of the encircling region; in a case that the positioning data of the terminal device in the electronic map is obtained, candidate location relationships between the terminal device and the inner boundary and the outer boundary may be determined according to the positioning data; and a real-time state used for representing a location relationship between the terminal device and the inner boundary is determined according to a historical state of the terminal device and the candidate location relationships.

A time at which the historical state is determined is earlier than a time at which the real-time state is determined, and the historical state is used for representing a historical location relationship between the terminal device and the inner boundary of the encircling region of the POI.

In some embodiments, to perform expansion processing to obtain the outer boundary of the encircling region, a positioning drift value of the terminal device in the electronic map during positioning may be determined; and the original boundary of the encircling region is used as the inner boundary, and expansion processing is performed outward from different locations of the inner boundary, to cause a minimum distance expanded outward from each of the different locations of the inner boundary to be greater than the positioning drift value, so as to obtain the outer boundary of the encircling region.

In some embodiments, to determine the positioning drift value of the terminal device in the electronic map during positioning, an attribute value of the terminal device may be obtained, where the attribute value of the terminal device includes at least one of the following: a type of the terminal device or a hardware parameter of the terminal device; and a positioning drift value corresponding to the attribute value of the terminal device is determined.

In some embodiments, to determine the positioning drift value of the terminal device in the electronic map during positioning, a state of a positioning signal used for performing positioning in the electronic map may be obtained; an environment feature of the POI is obtained; and the positioning drift value of the terminal device in the electronic map is determined according to the state of the positioning signal and the environment feature.

In some embodiments, at least one of the following operations may be performed: determining the real-time state as that the terminal device is located outside the inner boundary in a case that the historical state of the terminal device represents that the terminal device is located outside the inner boundary and the candidate location relationships represent that the terminal device is located outside the inner boundary; determining the real-time state as that the terminal device is located inside the inner boundary in a case that the historical state of the terminal device represents that the terminal device is located outside the inner boundary and the candidate location relationships represent that the terminal device is located inside the inner boundary; determining the real-time state as that the terminal device is located outside the inner boundary of the encircling region in a case that the historical state of the terminal device represents that the terminal device is located inside the inner boundary and the candidate location relationships represent that the terminal device is located outside the outer boundary; and determining the real-time state as that the terminal device is located inside the inner boundary of the encircling region in a case that the historical state of the terminal device represents that the terminal device is located inside the inner boundary and the candidate location relationships represent that the terminal device is located inside the outer boundary.

The following describes an example embodiment. An example in which the encircling region is a geo-fencing region is used, noise reduction may be performed on a state of the geo-fencing region, to accurately determine an enter/exit state (corresponding to the real-time state above) of the user relative to the geo-fencing region, and whether to perform information recommendation (namely, whether to output the information about the POT) for the user is further determined according to the enter/exit state. Therefore, the accuracy and effectiveness of information recommendation can be improved, to avoid information interference to the user caused by information recommendation performed at a wrong moment.

A geo-fencing function is a quite core and important service form in a geographic location-related service field. For example, in gourmet food recommendation based on a geographic location of a user, when the user enters a geo-fencing region of a gourmet food merchant, a push notification of the gourmet food merchant may be transmitted to the user. In another example, in nearby people social recommendation based on a geo-fencing region, the user may autonomously set a geo-fencing region, and a social application may push suitable users within the geo-fencing region to the user, to expand a social relationship of the user. Even in delivery planning and management in the logistics field, in a case that a delivery or takeout enters a geo-fencing region (for example, a cell) in which the user is located, a notification may be transmitted to the user, to prompt that the delivery or takeout is to be delivered for a moment. In addition, the geo-fencing region may be used for resource layout in terms of city construction, and the geo-fencing region can provide a basic support capability.

Figure 11:
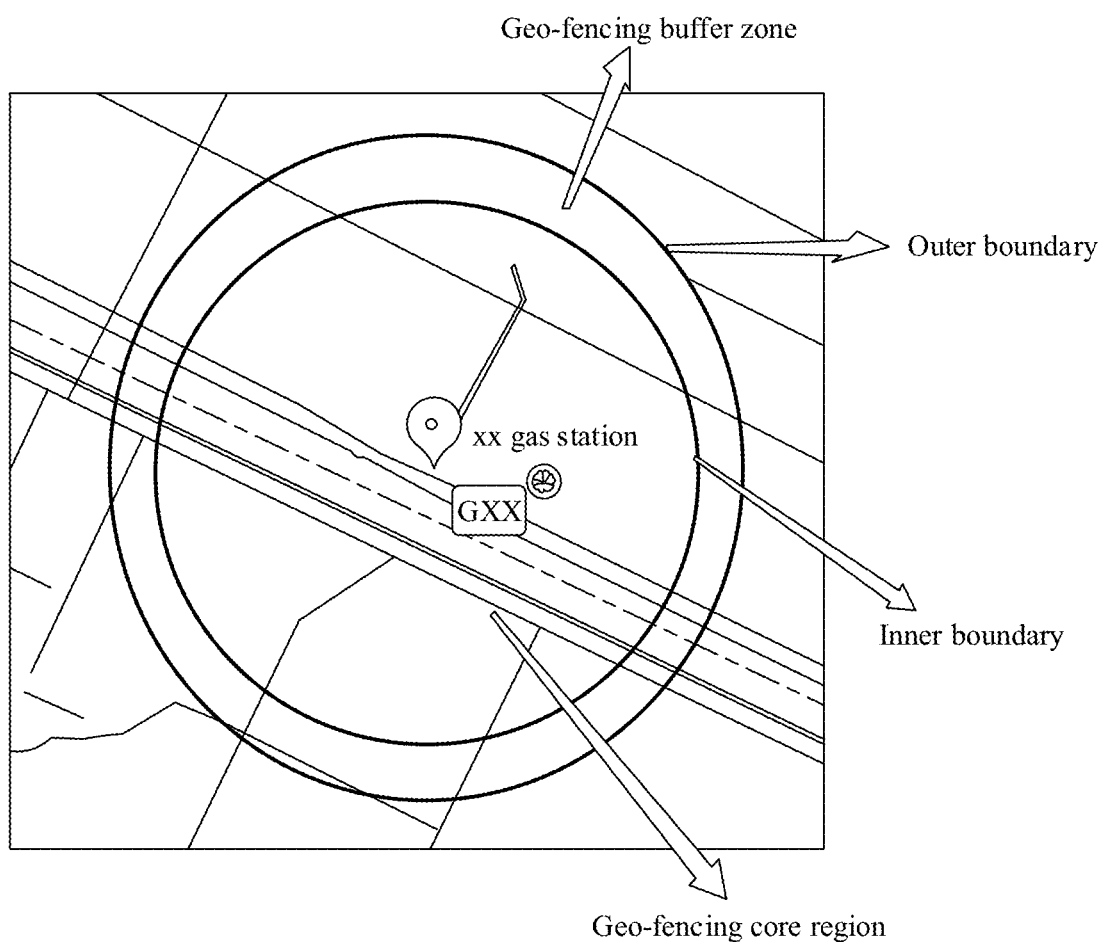
FIG. 11 is a schematic diagram of a composite geo-fencing region according to some embodiments.

To eliminate the effect of GPS drift (positioning drift) on determination of the enter/exit state, on the basis of a conventional geo-fencing region (a range of a polygon region), a composite geo-fencing region with a buffer region is expanded by expanding the polygon. FIG. 11 is a schematic diagram of a circular geo-fencing region, where the gas station is a POI. An outer boundary is obtained by expanding an inner boundary of the geo-fencing region, where the inner boundary is a core region of the geo-fencing, a geo-fencing buffer zone (buffer region) exists between the inner boundary and the outer boundary, and the core region and the buffer region form the composite geo-fencing region. As shown in FIG. 11, a concentric circle with a greater radius is drawn based on the core region of the circular composite geo-fencing region, so that a buffer region with an approximately equal width is formed between the two regions. Correspondingly, enter/exit state conversion determination of the geo-fencing region may also be correspondingly adjusted.

Figure 12:
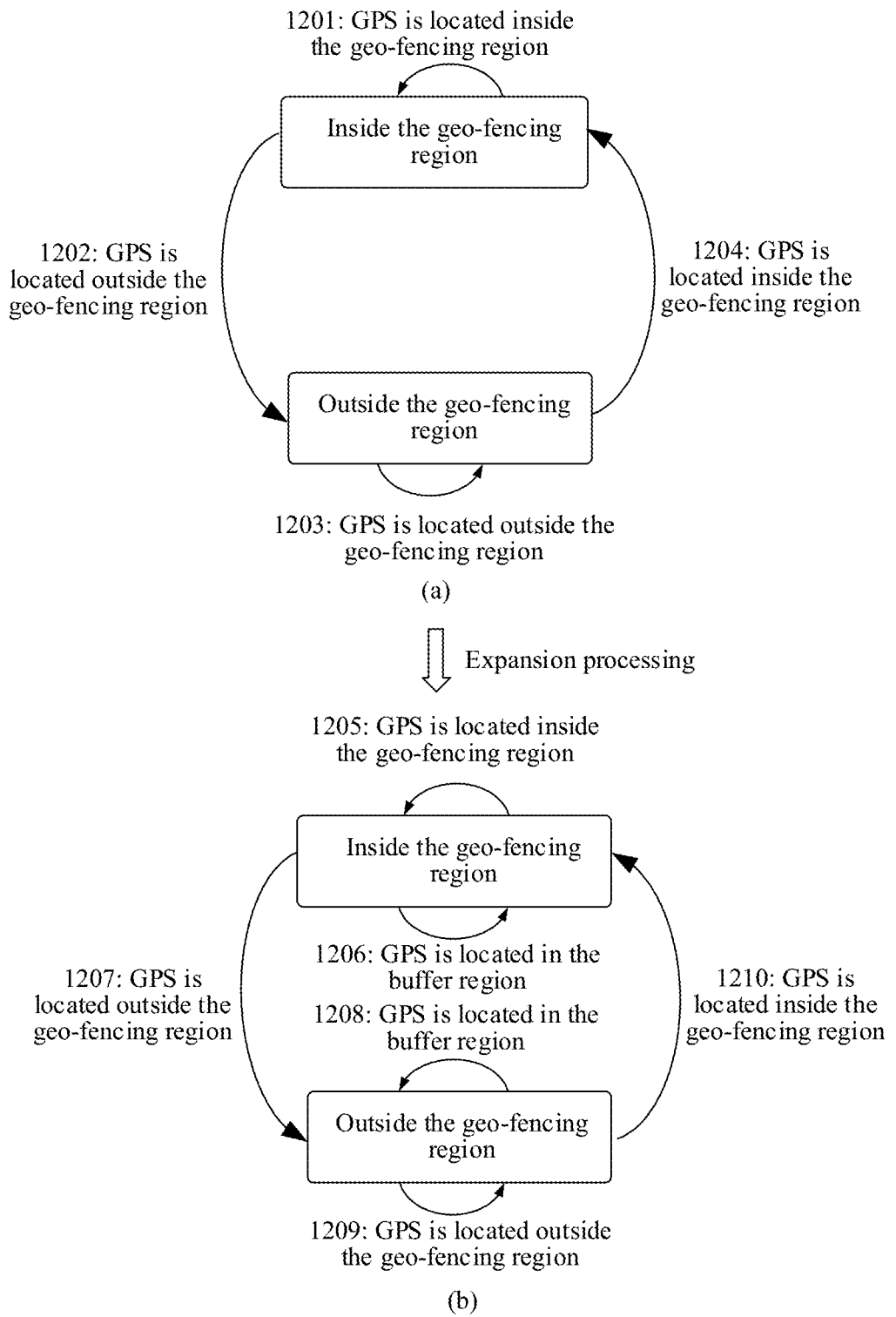
FIG. 12 is a diagram of enter/exit state conversion of a geo-fencing region according to some embodiments.

FIG. 12 is a diagram of enter/exit state conversion of a geo-fencing region. An enter/exit state conversion procedure of an original geo-fencing region (as shown by (a) in FIG. 12) is first described. In operation 1201, in a case that a GPS signal of a user displays that the user is located in the geo-fencing region, the real-time state of the user (namely, the real-time state of the terminal device hold by the user) represents that the user is located in the geo-fencing region. In operation 1202, in a case that the GPS signal of the user displays that the user is located outside the geo-fencing region, the real-time state of the user represents that the user is located outside the geo-fencing region. In operation 1203, in a case that the GPS signal of the user displays that the user is located outside the geo-fencing region, the real-time state of the user represents that the user is located outside the geo-fencing region. In operation 1204, in a case that the GPS signal of the user displays that the user is located in the geo-fencing region, the real-time state of the user represents that the user is located in the geo-fencing region. After a composite geo-fencing region with a buffer region is expanded by expanding the polygon, an enter/exit state conversion procedure of entering the conversed geo-fencing region (as shown by (b) in FIG. 12) is described. For example, in operation 1205, in a case that the user is located (actually located) in the geo-fencing region and the GPS signal of the user displays that the user is located in the geo-fencing region, it is determined that the real-time state of the user represents that the user is located in the geo-fencing region. In operation 1206, in a case that the user is located in the geo-fencing region and the GPS signal of the user displays that the user is located in the buffer region, it is determined that the real-time state of the user represents that the user is located in the geo-fencing region. In operation 1207, in a case that the user is located in the geo-fencing region and the GPS signal of the user displays that the user is located outside the geo-fencing region, it is determined that the real-time state of the user represents that the user is located outside the geo-fencing region. In operation 1208, in a case that the user is located outside the geo-fencing region and the GPS signal of the user displays that the user is located in the buffer region, it is determined that the real-time state of the user represents that the user is located outside the geo-fencing region. In operation 1209, in a case that the user is located outside the geo-fencing region and the GPS signal of the user displays that the user is located outside the geo-fencing region, it is determined that the real-time state of the user represents that the user is located outside the geo-fencing region. In operation 1210, in a case that the user is located outside the geo-fencing region and the GPS signal of the user displays that the user is located in the geo-fencing region, it is determined that the real-time state of the user represents that the user is located in the geo-fencing region.

It is assumed that a minimum width of the buffer region introduced by expansion is $W_{min}$ and a maximum with thereof is $W_{max}$, and a maximum value of GPS location change introduced by GPS drift is $D_{max}$, introduction of the buffer region may obtain the following characteristics:

(1) the space sensitivity of determination of entering a geo-fencing region is not affected;
 (2) the space sensitivity of determination of exiting from a geo-fencing region is reduced by $W_{max}$; and
 (3) if a width of the buffer region is appropriately selected to cause $D_{max}$ to be less than $W_{min}$, misjudgment on the enter/exit state of a geo-fencing region may be totally avoided.

Through the foregoing analyses in combination with the application scenario characteristics of the geo-fencing region, such as a current IOV application scenario, services are basically provided based on a determination moment of entering the geo-fencing region, which avoids misjudging the geo-fencing region state and obtains a quite great gain when compared with the space sensitivity when exiting the geo-fencing region. Meanwhile, suitable $W_{min}$ is appropriately selected, and a difference between $W_{min}$ and $W_{max}$ is reduced as much as possible, namely, to ensure spaces of the buffer region to be equal as much as possible, so that a shape distortion of the geo-fencing region may be avoided, and an actual effect of POI-based information recommendation may be improved.

Figure 13:
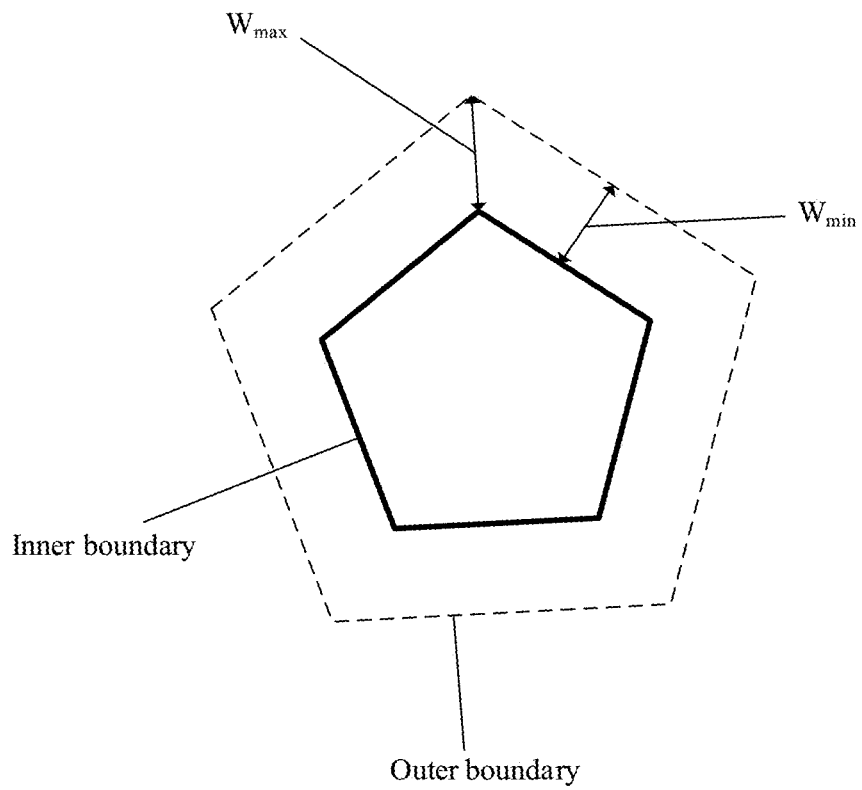
FIG. 13 is a schematic diagram of an effect of a polygon expansion algorithm according to some embodiments.

A polygon-offset algorithm may be used to offset and expand a boundary of an original geo-fencing region outward in an expansion manner, to obtain a boundary region boundary with an approximately equal width. For example, the polygon-offset algorithm may be completed by using open source ClipperLib. FIG. 13 is a schematic diagram of an effect of a polygon expansion algorithm. As can be seen from FIG. 13, $W_{min}$ is used to offset and expand a smooth boundary of an original boundary of a geo-fencing outward by segments, and edges are then connected in a conformal manner, namely, to ensure that angles in the original boundary remain unchanged. Therefore, as can be seen from FIG. 13, widths of the buffer region are not totally equal, a distance between parallel edges is a minimum width $W_{min}$, and a distance between vertexes is a maximum width $W_{max}$. In addition, in the polygon-offset algorithm, self-intersection during expansion may occur when processing a concave polygon, so that a non-concave polygon is preferentially selected as the inner boundary. Besides, the width of the buffer region may be set in combination with related parameters of a GPS module of a device such as IOV or a mobile terminal. For example, during application, an offset value may be selected as 50 meters.

Figure 14:
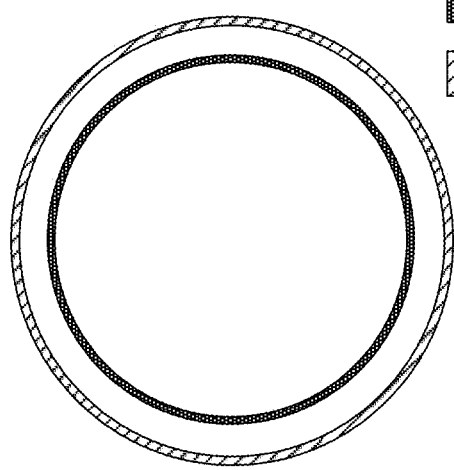
FIG. 14 is a schematic diagram of a geo-fencing boundary according to some embodiments.
Figure 15:
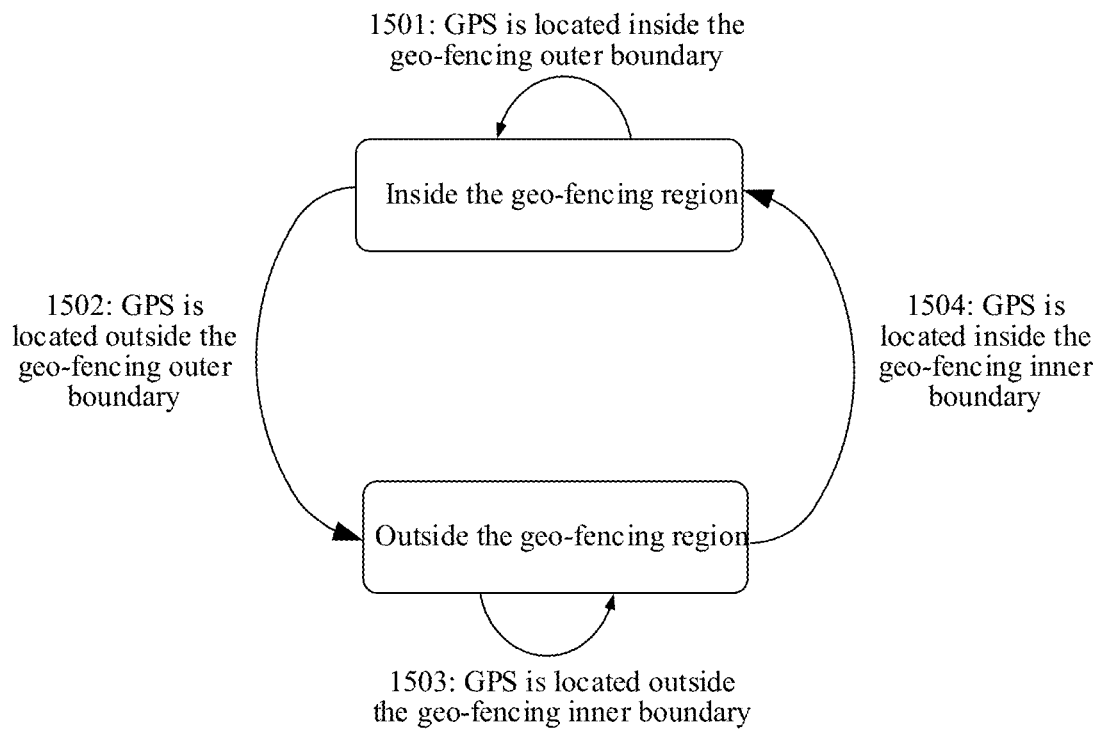
FIG. 15 is a schematic diagram of state conversion of a geo-fencing region according to some embodiments.

A geo-fencing region originally having a single core region is converted into two geo-fencing regions having a buffer region through boundary expansion. FIG. 14 is a schematic diagram of boundaries of a geo-fencing region. A boundary of an original geo-fencing region is referred to as a "geo-fencing inner boundary" (inner boundary), and a boundary of a composite geo-fencing region with a larger area obtained through expansion is referred to as a "geo-fencing outer boundary" (outer boundary). In a current geo-fencing algorithm, a relative relationship between a location point of a user and a polygon is mainly determined through a geometrical method, to determine the relative relationship between a location of the user and a geo-fencing region. A geo-fencing originally having a single boundary is updated to two concentric geo-fencing regions by an outer boundary introduced in the geo-fencing region state processing method shown in some embodiments. Further, relative relationships between a current location of the user and two geo-fencing boundaries may be integrated, and a location relationship between the current location of the user and an entire geo-fencing may be further calculated by integrating a historical state of the user. FIG. 15 is a schematic diagram of state conversion of a geo-fencing region. In operation 1501, in a case that the user is located in the geo-fencing region and a GPS signal of the user displays that the user is located in the geo-fencing outer boundary, it is determined that the real-time state of the user represents that the user is located in the geo-fencing inner boundary. In operation 1502, in a case that the user is located in the geo-fencing region and the GPS signal of the user displays that the user is located outside the geo-fencing outer boundary, it is determined that the real-time state of the user represents that the user is located outside the geo-fencing inner boundary. In operation 1503, in a case that the user is located outside the geo-fencing region and the GPS signal of the user displays that the user is located outside the geo-fencing inner boundary, it is determined that the real-time state of the user represents that the user is located outside the geo-fencing inner boundary. In operation 1504, in a case that the user is located outside the geo-fencing region and the GPS signal of the user displays that the user is located in the geo-fencing inner boundary, it is determined that the real-time state of the user represents that the user is located in the geo-fencing inner boundary.

For example, to implement the foregoing state conversion strategy of the geo-fencing region, the following strategy details may be introduced during an engineering implementation:

Geo-fencing matching: the boundary is marked in data cleaning and geo-fencing expansion processes, where a POI in a geographic information system corresponding to a current geo-fencing region range is marked, and the boundary is marked as an inner boundary or an outer boundary, to help match and distinguish the geo-fencing region through a marker.

Historical state recording: in the related art, a geo-fencing region having a single boundary is stateless, namely, a current location state of the user is unrelated to a previous location state thereof. In the POI-based information recommendation method provided in some embodiments, the historical state of the user may be combined, so that historical state maintenance may be performed during an algorithm engineering implementation.

Figure 16:
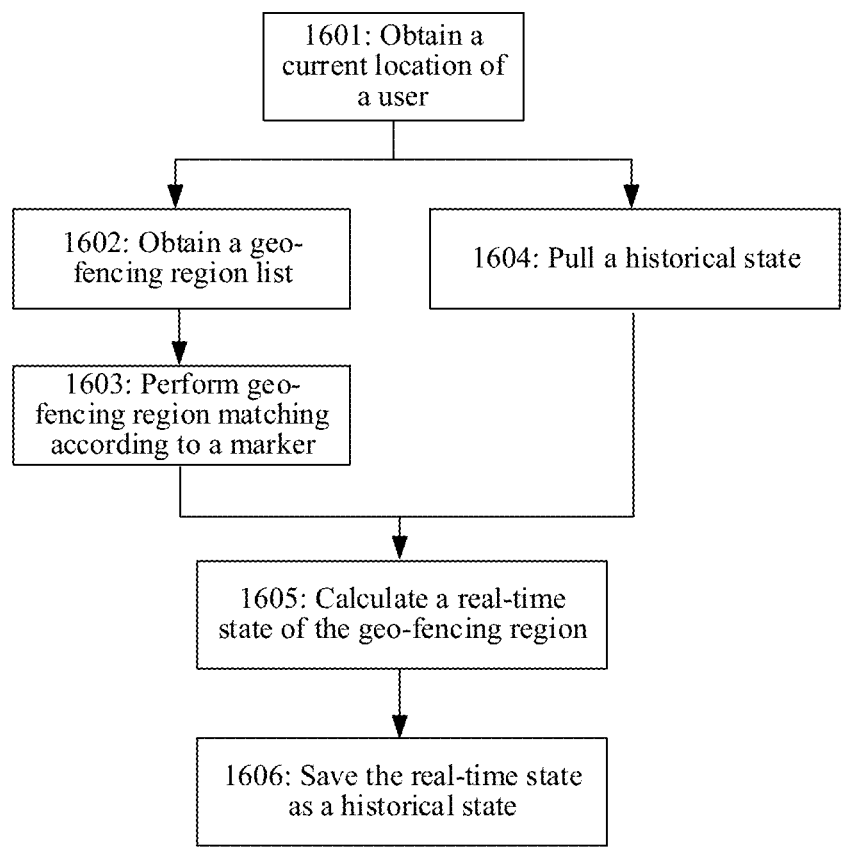
FIG. 16 is an implementation flowchart of controlling state conversion of a geo-fencing region according to some embodiments.

FIG. 16 is an implementation flowchart of controlling state conversion of a geo-fencing region. In operation 1601, a current location of a user is obtained. In operation 1602, a geo-fencing region list is obtained. In operation 1603, a matching geo-fencing region is determined from the geo-fencing region list according to a marker, and an inner boundary and an outer boundary of the matching geo-fencing region are further determined. In operation 1604, a historical state of the user relative to the geo-fencing region is pulled. In operation 1605, a real-time state of the user relative to the matching geo-fencing region is calculated according to the current location of the user, the inner boundary of the matching geo-fencing region, the outer boundary of the matching geo-fencing region, and the historical state of the matching geo-fencing region. In operation 1606, the real-time state is used as a historical state and saved.

Figure 17:
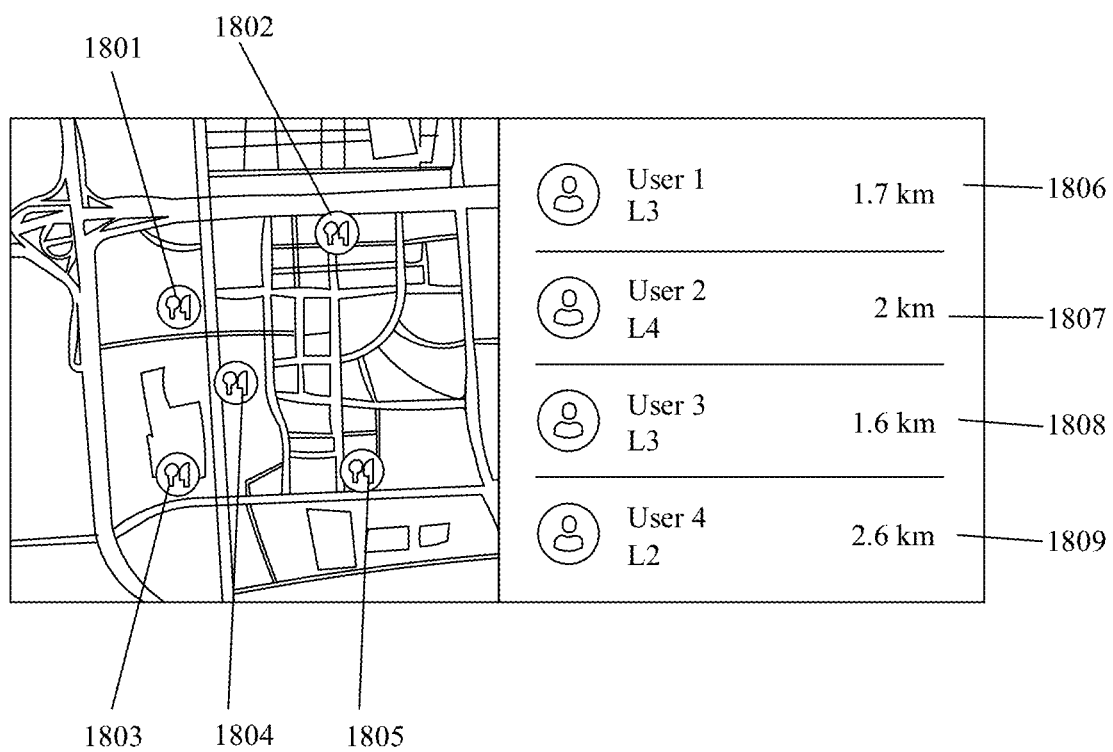
FIG. 17 is a schematic diagram of a location service according to some embodiments.

Functions of the geo-fencing region may be applicable to related applications in current IOV. For example, the functions may be gourmet food recommendation based on a destination of a user, scenery spot recommendation based on a destination of a user, and a gas station entry notification. FIG. 17 is a schematic diagram of geo-fencing region-based location services. By using the POI-based information recommendation method shown in some embodiments, in a case that the enter/exit state represents that the user is located inside the inner boundary of the geo-fencing region (for example, a gas station or a service station), gourmet food merchants 1801 to 1805 within the geo-fencing region may be accurately recommended to the user. Namely, identifiers of the gourmet food merchants 1801 to 1805 are displayed in an electronic map for the user to perform merchant selection and consumption. Alternatively, social users 1806 to 1809 with the geo-fencing region may be recommended to the user, namely, related information (for example, a user name, a user level, or a distance) about the social users 1806 to 1809 is displayed in a user list, to expand a social relationship of the user. In a case that the enter/exit state represents that the user is located outside the inner boundary of the geo-fencing region, it indicates that the user does not need to pay attention to the POI in the geo-fencing region in this case, so that recommendation of the gourmet food merchants 1801 to 1805 and the social users 1806 to 1809 in the geo-fencing region may be stopped. For example, display of the identifiers of the gourmet food merchants 1801 to 1805 in the electronic map is stopped, and display of the related information about the social users 1806 to 1809 in the user list is stopped. In this way, information interference to the user may be effectively avoided.

The following continues to describe an example structure in which a point of interest (POI)-based information recommendation apparatus provided in some embodiments is implemented as a software module. In some embodiments, as shown in FIG. 2, a software module in the POI-based information recommendation apparatus 233 stored in the memory 230 may include: an obtaining module 2331, configured to obtain an encircling region encircling a POI in an electronic map; an expanding module 2332, configured to use an original boundary of the encircling region as an inner boundary and perform expansion processing on the inner boundary, to obtain an outer boundary of the encircling region; a location module 2333, configured to determine candidate location relationships between a terminal device and the inner boundary and the outer boundary according to positioning data of the terminal device; a state module 2334, configured to determine a real-time state according to a historical state of the terminal device and the candidate location relationships, the real-time state being used for representing a location relationship between the terminal device and the inner boundary; and a control module 2335, configured to control, according to the real-time state, information about the POI outputted through a location service.

In some embodiments, the expanding module 2332 may be further configured to: determine a positioning drift value of the terminal device in the electronic map during positioning; and use the original boundary of the encircling region as the inner boundary, and perform expansion processing outward from different locations of the inner boundary, to cause a minimum distance expanded outward from each of the different locations of the inner boundary to be greater than the positioning drift value, so as to obtain the outer boundary of the encircling region.

In some embodiments, the expanding module 2332 may be further configured to: obtain an attribute value of the terminal device, where the attribute value of the terminal device includes at least one of the following: a type of the terminal device or a hardware parameter of the terminal device; and determine a positioning drift value corresponding to the attribute value of the terminal device.

In some embodiments, the expanding module 2332 may be further configured to: obtain a state of a positioning signal used for performing positioning in the electronic map; obtain an environment feature of the POI; and determine the positioning drift value of the terminal device in the electronic map according to the state of the positioning signal and the environment feature.

In some embodiments, the state module 2334 may be further configured to perform at least one of the following processing: determining the real-time state as that the terminal device is located outside the inner boundary in a case that the historical state of the terminal device represents that the terminal device is located outside the inner boundary and the candidate location relationships represent that the terminal device is located outside the inner boundary; determining the real-time state as that the terminal device is located inside the inner boundary in a case that the historical state of the terminal device represents that the terminal device is located outside the inner boundary and the candidate location relationships represent that the terminal device is located inside the inner boundary; determining the real-time state as that the terminal device is located outside the inner boundary in a case that the historical state of the terminal device represents that the terminal device is located inside the inner boundary and the candidate location relationships represent that the terminal device is located outside the outer boundary; and determining the real-time state as that the terminal device is located inside the inner boundary in a case that the historical state of the terminal device represents that the terminal device is located inside the inner boundary and the candidate location relationships represent that the terminal device is located inside the outer boundary.

In some embodiments, the control module 2335 may be further configured to: output the information about the POI through the location service in a case that the real-time state is that the terminal device is located inside the inner boundary; and stop outputting the information about the POI through the location service in a case that the real-time state is that the terminal device is located outside the inner boundary.

Some embodiments may provide a computer program product or a computer program. The computer program product or the computer program includes computer instructions. The computer instructions are stored in a computer-readable storage medium. A processor of a computer device reads the computer instructions from the computer-readable storage medium and executes the computer instructions, to cause the computer device to perform the foregoing POI-based information recommendation method.

Some embodiments may provide a computer-readable storage medium storing executable instructions. When the executable instructions are executed by a processor, the processor is caused to perform the POI-based information recommendation method.

Based on the above, the following technical effects may be achieved through the embodiments of the disclosure:

(1) By determining the association between the attribute value of the terminal device and the positioning drift value or the association between the state-environment feature combination and the positioning drift value, the positioning drift value is quickly determined according to a real-time situation, thereby improving the accuracy and speed of determining the positioning drift value.

(2) Expansion procession is performed according to the maximum value of the determined positioning drift value range, so that the minimum distance expanded outward is greater than the positioning drift value, namely, the positioning drift value may not exceed the buffer region, thereby improving the accuracy of determining the encircling region state.

(3) The user is determined to be located outside the inner boundary of the encircling region only in a case that the user moves from the inside of the inner boundary of the encircling region to the outside of the outer boundary; and the user is still determined to be located inside the inner boundary in a case that the user moves from the inside of the inner boundary of the encircling region to the location between the inner boundary and the outer boundary. In this way, a problem that the enter/exit state of the encircling region changes frequently due to a positioning signal drift is eliminated, so that the accuracy of POI-based information recommendation is improved, and the interaction efficiency between the terminal device and the location service is also improved, thereby implementing resource saving.

The foregoing descriptions are merely embodiments of the disclosure and are not intended to limit the protection scope therein. Any modification, equivalent replacement, or improvement made without departing from the spirit and range of the disclosure shall fall within the protection scope of the disclosure.

What is claimed is:

1. A method for eliminating GPS drift in estimation of geo-fencing region, performed by an electronic device, the method comprising:
   determining a first geo-fencing region;
   using a boundary of the first geo-fencing region as an inner boundary of a geo-fencing buffer region, determining an outer boundary of the geo-fencing buffer region based on an expansion of the inner boundary;
   obtaining, via a network interface of the electronic device, one or more GPS signals comprising real-time positioning data of a terminal device, the real-time positioning data comprising a real-time location of the terminal device;
   determining a first relative position of the terminal device based on the real-time positioning data of the terminal device and the inner boundary;
   determining whether the terminal device is within the geo-fencing buffer region based on the real-time positioning data of the terminal device and the outer boundary;
   determining, based on the first relative position of the terminal device, whether the terminal device is within the geo-fencing buffer region, and a historical state of the terminal device, whether the terminal device is within the first geo-fencing region; and
   controlling a location service run in the terminal device and causing the terminal device to output information about a location when the terminal device is within the first geo-fencing region,
   wherein determining the outer boundary of the geo-fencing buffer region comprises:
      determining a positioning drift value of the terminal device during positioning; and
      determining the outer boundary based on expansion of the first geo-fencing region from the inner boundary by at least a minimum distance outward from different locations of the inner boundary, the minimum distance being greater than the positioning drift value.

2. The method according to claim 1, further comprising at least one of the following operations:
   continuing outputting the information through the location service based on the terminal device being transferred from the inside of the inner boundary into the geo-fencing buffer region;
   stopping outputting the information through the location service based on the terminal device being transferred from the inside of the inner boundary to the outside of the outer boundary;
   outputting the information through the location service based on the terminal device being transferred from the outside of the outer boundary to the inside of the inner boundary; and
   stopping outputting the information through the location service based on the terminal device being continuously located outside the outer boundary or is transferred from the outside of the outer boundary into the geo-fencing buffer region.

3. The method according to claim 1, wherein the determining a positioning drift value of the terminal device comprises:
   obtaining an attribute value of the terminal device, wherein
   the attribute value of the terminal device comprises at least one of the following: a type of the terminal device or a hardware parameter of the terminal device; and
   determining a positioning drift value corresponding to the attribute value of the terminal device.

4. The method according to claim 1, wherein the determining a positioning drift value comprises:
   obtaining a state of a positioning signal used for performing positioning of the terminal device;
   obtaining an environment feature of the location; and
   determining the positioning drift value of the terminal device according to the state of the positioning signal and the environment feature.

5. The method according to claim 1, wherein the inner boundary comprises a plurality of boundary segments; and the determining the outer boundary based on expansion of the first geo-fencing region from the inner boundary by at least a minimum distance outward from different locations of the inner boundary comprises:

performing expansion processing outward from the plurality of boundary segments respectively, to cause a minimum distance expanded outward from each of the plurality of boundary segments to be greater than the positioning drift value; and performing conformal connection processing on the plurality of expanded boundary segments, to obtain the outer boundary.

6. The method according to claim 1, wherein the determining whether the terminal device is within the first geo-fencing region comprises at least one of the following:

determining that the terminal device is not within the first geo-fencing region in a case that the historical state of the terminal device represents that the terminal device is located outside the inner boundary and the first relative position represents that the terminal device is located outside the inner boundary;

determining that the terminal device is within the first geo-fencing region in a case that the historical state of the terminal device represents that the terminal device is located outside the inner boundary and the first relative position represents that the terminal device is located inside the inner boundary;

determining the terminal device is not within the first geo-fencing region in a case that the historical state of the terminal device represents that the terminal device is located inside the inner boundary and the first relative position represents that the terminal device is located outside the outer boundary; and determining that the terminal device is within the first geo-fencing region in a case that the historical state of the terminal device represents that the terminal device is located inside the inner boundary and the first relative position represents that the terminal device is located inside the outer boundary.

7. An apparatus for eliminating GPS drift in estimation of geo-fencing region, comprising:

at least one memory configured to store program code; and at least one processor configured to read the program code and execute the program code, the program code comprising:

obtaining code configured to cause the at least one processor to determining a first geo-fencing region and obtain, via a network interface, one or more GPS signals comprising real-time positioning data of a terminal device, the real-time positioning data comprising a real-time location of the terminal device;

expanding code configured to cause the at least one processor to use a boundary of the first geo-fencing region as an inner boundary of a geo-fencing buffer region and determine an outer boundary of the geo-fencing buffer region based on an expansion of the inner boundary;

location code configured to cause the at least one processor to determine a first relative position of the terminal device based on the real-time positioning data, and determine whether the terminal device is within the geo-fencing buffer region based on the real-time positioning data of the terminal device and the outer boundary;

state code configured to cause the at least one processor to determine, based on the first relative position of the terminal device, whether the terminal device is within the geo-fencing buffer region, and a historical state of the terminal device, whether the terminal device is within the first geo-fencing region; and control code configured to cause the at least one processor to control a location service run in the terminal device and cause the terminal device to output information about a location when the terminal device is within the first geo-fencing region, wherein the expanding code is further configured to cause the at least one processor to:

determine a positioning drift value of the terminal device during positioning; and determine the outer boundary based on expansion of the first geo-fencing region from the inner boundary by at least a minimum distance outward from different locations of the inner boundary, the minimum distance being greater than the positioning drift value.

8. The apparatus according to claim 7, wherein the expanding code is further configured to cause the at least one processor to:

obtain a state of a positioning signal used for performing positioning of the terminal device;

obtain an environment feature of the location; and determine the positioning drift value of the terminal device according to the state of the positioning signal and the environment feature.

9. The apparatus according to claim 7, wherein the expanding code is further configured to cause the at least one processor to:

obtain an attribute value of the terminal device, where the attribute value of the terminal device includes at least one of the following: a type of the terminal device or a hardware parameter of the terminal device; and determine a positioning drift value corresponding to the attribute value of the terminal device.

10. The apparatus according to claim 7, wherein the state code is further configured to cause the at least one processor to perform at least one of the following:

determine that the terminal device is not within the first geo-fencing region in a case that the historical state of the terminal device represents that the terminal device is located outside the inner boundary and the first relative position represents that the terminal device is located outside the inner boundary;

determine that the terminal device is within the first geo-fencing region in a case that the historical state of the terminal device represents that the terminal device is located outside the inner boundary and the first relative position represents that the terminal device is located inside the inner boundary;

determine that the terminal device is not within the first geo-fencing region in a case that the historical state of the terminal device represents that the terminal device is located inside the inner boundary and the first relative position represents that the terminal device is located outside the outer boundary; and determine that the terminal device is within the first geo-fencing region in a case that the historical state of the terminal device represents that the terminal device is located inside the inner boundary and the first relative position represents that the terminal device is located inside the outer boundary.

11. The apparatus according to claim 7, wherein the control code is further configured to cause the at least one processor to:

stop outputting the information through the location service based on the terminal device being transferred from the inside of the inner boundary to the outside of the outer boundary;

output the information about the location through the location service based on the terminal device being transferred from the outside of the outer boundary to the inside of the inner boundary; and stop outputting the information about the location through the location service based on the terminal device being continuously located outside the outer boundary or is transferred from the outside of the outer boundary into the geo-fencing buffer region.

12. A non-transitory computer-readable storage medium, storing computer code that when executed by at least one processor causes the at least one processor to:

determine a first geo-fencing region;

use a boundary of the first geo-fencing region as an inner boundary of a geo-fencing buffer region and determine an outer boundary of the geo-fencing buffer region based on an expansion of the inner boundary;

obtain, via a network interface of an electronic device, one or more GPS signals comprising real-time positioning data of a terminal device, the real-time positioning data comprising a real-time location of the terminal device;

determine a first relative position based on the real-time positioning data of the terminal device and the inner boundary;

determine whether the terminal device is within the geo-fencing buffer region based on the real-time positioning data of the terminal device and the outer boundary;

determine, based on the first relative position of the terminal device, whether the terminal device is within the geo-fencing buffer region, and a historical state of the terminal device, whether the terminal device is within the first geo-fencing region; and control a location service run in the terminal device and cause the terminal device to output information when the terminal device is within the first geo-fencing region, wherein determining the outer boundary of the geo-fencing buffer region comprises:

determining a positioning drift value of the terminal device during positioning; and determining the outer boundary based on expansion of the first geo-fencing region from the inner boundary by at least minimum distance outward from different locations of the inner boundary, the minimum distance being greater than the positioning drift value.

13. The non-transitory computer-readable storage medium according to claim 12, wherein the at least one processor is configured to perform at least one of the following operations:

stop outputting the information about the location through the location service based on the terminal device being transferred from the inside of the inner boundary to the outside of the outer boundary;

output the information about the location through the location service based on the terminal device being transferred from the outside of the outer boundary to the inside of the inner boundary; and stop outputting the information about the location through the location service based on the terminal device being continuously located outside the outer boundary or is transferred from the outside of the outer boundary into the geo-fencing buffer region.

14. The non-transitory computer-readable storage medium according to claim 12, wherein the determining a positioning drift value of the terminal device comprises:

obtaining an attribute value of the terminal device, wherein the attribute value of the terminal device comprises at least one of the following: a type of the terminal device or a hardware parameter of the terminal device; and determining a positioning drift value corresponding to the attribute value of the terminal device.

15. The non-transitory computer-readable storage medium according to claim 12, wherein the determining a positioning drift value of the terminal device comprises:

obtaining a state of a positioning signal used for performing positioning of the terminal device;

obtaining an environment feature of the location; and determining the positioning drift value of the terminal device according to the state of the positioning signal and the environment feature.

* * * * *